(12) United States Patent
Tu et al.

(10) Patent No.: US 8,179,974 B2
(45) Date of Patent: May 15, 2012

(54) MULTI-LEVEL REPRESENTATION OF REORDERED TRANSFORM COEFFICIENTS

(75) Inventors: Chengjie Tu, Sammamish, WA (US); Shankar Regunathan, Redmond, WA (US); Shijun Sun, Bellevue, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 12/151,069

(22) Filed: May 2, 2008

(65) Prior Publication Data

US 2009/0273706 A1    Nov. 5, 2009

(51) Int. Cl.
*H04B 1/66* (2006.01)

(52) U.S. Cl. ......... 375/240.24; 375/240.23; 375/240.26; 382/246; 382/245; 382/244

(58) Field of Classification Search ............. 375/240.24, 375/240.23, 240.26; 382/246, 245, 244
See application file for complete search history.

(56) References Cited

U.S. PATENT DOCUMENTS

| | | |
|---|---|---|
| 4,420,771 A | 12/1983 | Pirsch |
| 4,698,672 A | 10/1987 | Chen |
| 4,730,348 A | 3/1988 | MacCrisken |
| 4,792,981 A | 12/1988 | Cahill et al. |
| 4,813,056 A | 3/1989 | Fedele |
| 4,901,075 A | 2/1990 | Vogel |
| 4,968,135 A | 11/1990 | Wallace et al. |
| 5,043,919 A | 8/1991 | Callaway et al. |
| 5,089,818 A | 2/1992 | Mahieux et al. |
| 5,109,451 A | 4/1992 | Aono et al. |
| 5,128,758 A | 7/1992 | Azadegan |
| 5,146,324 A | 9/1992 | Miller et al. |
| 5,179,442 A | 1/1993 | Azadegan |
| 5,227,788 A | 7/1993 | Johnston |
| 5,227,878 A | 7/1993 | Puri et al. |
| 5,253,053 A | 10/1993 | Chu et al. |
| 5,266,941 A | 11/1993 | Akeley et al. |
| 5,270,832 A | 12/1993 | Balkanski et al. |
| 5,367,629 A | 11/1994 | Chu et al. |
| 5,373,513 A | 12/1994 | Howe et al. |

(Continued)

FOREIGN PATENT DOCUMENTS

EP    0 540 350    5/1993

(Continued)

OTHER PUBLICATIONS

Brandenburg, "ASPEC Coding," *AES 10th International Conference*, pp. 81-90 (Sep. 1991).

(Continued)

*Primary Examiner* — Shawn An
(74) *Attorney, Agent, or Firm* — Klarquist Sparkman, LLP

(57) ABSTRACT

Techniques and tools for encoding and decoding a block of frequency coefficients are presented. An encoder selects a scan order from multiple available scan orders and then applies the selected scan order to a two-dimensional matrix of transform coefficients, grouping non-zero values of the frequency coefficients together in a one-dimensional string. The encoder entropy encodes the one-dimensional string of coefficient values according to a multi-level nested set representation. In decoding, a decoder entropy decodes the one-dimensional string of coefficient values from the multi-level nested set representation. The decoder selects the scan order from among multiple available scan orders and then reorders the coefficients back into a two-dimensional matrix using the selected scan order.

29 Claims, 20 Drawing Sheets

U.S. PATENT DOCUMENTS

| | | | |
|---|---|---|---|
| 5,376,968 A | 12/1994 | Wu et al. |
| 5,381,144 A | 1/1995 | Wilson et al. |
| 5,394,170 A | 2/1995 | Akeley et al. |
| 5,400,075 A | 3/1995 | Savatier |
| 5,408,234 A | 4/1995 | Chu |
| 5,457,495 A | 10/1995 | Hartung |
| 5,461,421 A | 10/1995 | Moon |
| 5,467,134 A | 11/1995 | Laney |
| 5,481,553 A | 1/1996 | Suzuki |
| 5,493,407 A | 2/1996 | Takahara |
| 5,504,591 A | 4/1996 | Dujari |
| 5,508,816 A | 4/1996 | Ueda et al. |
| 5,533,140 A | 7/1996 | Sirat et al. |
| 5,535,305 A | 7/1996 | Acero et al. |
| 5,544,286 A | 8/1996 | Laney |
| 5,559,557 A | 9/1996 | Kato et al. |
| 5,568,167 A | 10/1996 | Galbi et al. |
| 5,574,449 A | 11/1996 | Golin |
| 5,579,430 A | 11/1996 | Grill et al. |
| 5,592,584 A | 1/1997 | Ferreira et al. |
| 5,627,938 A | 5/1997 | Johnston |
| 5,654,706 A | 8/1997 | Jeong et al. |
| 5,661,755 A | 8/1997 | Van De Kerkhof |
| 5,664,057 A | 9/1997 | Crossman et al. |
| 5,675,332 A | 10/1997 | Limberg |
| 5,714,950 A * | 2/1998 | Jeong et al. ............... 341/67 |
| 5,717,821 A | 2/1998 | Tsutsui |
| 5,732,156 A | 3/1998 | Watanabe et al. |
| 5,734,340 A | 3/1998 | Kennedy |
| 5,748,789 A | 5/1998 | Lee et al. |
| 5,793,897 A | 8/1998 | Jo et al. |
| 5,801,648 A | 9/1998 | Satoh et al. |
| 5,802,213 A | 9/1998 | Gardos |
| 5,812,971 A | 9/1998 | Herre |
| 5,819,215 A | 10/1998 | Dobson et al. |
| 5,825,830 A | 10/1998 | Kopf |
| 5,825,979 A | 10/1998 | Tsutsui et al. |
| 5,828,426 A | 10/1998 | Yu |
| 5,831,559 A | 11/1998 | Agarwal et al. |
| 5,835,030 A | 11/1998 | Tsutsui et al. |
| 5,835,144 A | 11/1998 | Matsumura |
| 5,844,508 A | 12/1998 | Murashita et al. |
| 5,850,482 A | 12/1998 | Meany et al. |
| 5,883,633 A | 3/1999 | Gill et al. |
| 5,884,269 A | 3/1999 | Cellier et al. |
| 5,889,891 A | 3/1999 | Gersho et al. |
| 5,903,231 A | 5/1999 | Emelko |
| 5,946,043 A | 8/1999 | Lee et al. |
| 5,969,650 A | 10/1999 | Wilson et al. |
| 5,974,184 A | 10/1999 | Eifrig et al. |
| 5,974,380 A | 10/1999 | Smyth et al. |
| 5,982,437 A | 11/1999 | Okazaki et al. |
| 5,983,172 A | 11/1999 | Takashima et al. |
| 5,990,960 A | 11/1999 | Murakami |
| 5,991,451 A | 11/1999 | Keith et al. |
| 5,995,670 A | 11/1999 | Zabinsky |
| 6,002,439 A | 12/1999 | Murakami |
| 6,009,387 A | 12/1999 | Ramaswamy et al. |
| 6,026,195 A | 2/2000 | Eifrig et al. |
| 6,038,536 A | 3/2000 | Haroun et al. |
| 6,041,302 A | 3/2000 | Bruekers |
| 6,049,630 A | 4/2000 | Wang et al. |
| 6,054,943 A | 4/2000 | Lawrence |
| 6,078,691 A | 6/2000 | Luttmer |
| 6,097,759 A | 8/2000 | Murakami |
| 6,097,880 A | 8/2000 | Koyata |
| 6,100,825 A | 8/2000 | Sedluk |
| 6,111,914 A | 8/2000 | Bist |
| 6,140,944 A | 10/2000 | Toyoyama |
| 6,148,109 A | 11/2000 | Boon |
| 6,154,572 A | 11/2000 | Chaddha |
| 6,195,465 B1 | 2/2001 | Zandi et al. |
| 6,205,256 B1 | 3/2001 | Chaddha |
| 6,208,274 B1 | 3/2001 | Taori et al. |
| 6,215,910 B1 | 4/2001 | Chaddha |
| 6,223,162 B1 | 4/2001 | Chen |
| 6,226,407 B1 | 5/2001 | Zabih et al. |
| 6,233,017 B1 | 5/2001 | Chaddha |
| 6,233,359 B1 | 5/2001 | Ratnakar et al. |
| 6,253,165 B1 | 6/2001 | Malvar |
| 6,259,810 B1 | 7/2001 | Gill et al. |
| 6,272,175 B1 | 8/2001 | Sriram et al. |
| 6,292,588 B1 | 9/2001 | Shen |
| 6,300,888 B1 | 10/2001 | Chen |
| 6,304,928 B1 | 10/2001 | Mairs et al. |
| 6,337,881 B1 | 1/2002 | Chaddha |
| 6,341,165 B1 | 1/2002 | Gbur |
| 6,345,123 B1 | 2/2002 | Boon |
| 6,349,152 B1 | 2/2002 | Chaddha |
| 6,360,019 B1 | 3/2002 | Chaddha |
| 6,377,930 B1 | 4/2002 | Chen |
| 6,392,705 B1 | 5/2002 | Chaddha |
| 6,404,931 B1 | 6/2002 | Chen |
| 6,408,029 B1 | 6/2002 | McVeigh et al. |
| 6,420,980 B1 | 7/2002 | Ejima |
| 6,421,738 B1 | 7/2002 | Ratan et al. |
| 6,424,939 B1 | 7/2002 | Herre et al. |
| 6,441,755 B1 | 8/2002 | Dietz et al. |
| 6,477,280 B1 | 11/2002 | Malvar |
| 6,487,535 B1 | 11/2002 | Smyth et al. |
| 6,493,385 B1 | 12/2002 | Sekiguchi et al. |
| 6,542,631 B1 | 4/2003 | Ishikawa |
| 6,542,863 B1 | 4/2003 | Surucu |
| 6,567,781 B1 | 5/2003 | Lafe |
| 6,573,915 B1 | 6/2003 | Sivan et al. |
| 6,580,834 B2 | 6/2003 | Li et al. |
| 6,587,057 B2 | 7/2003 | Scheuermann |
| 6,608,935 B2 | 8/2003 | Nagumo et al. |
| 6,636,168 B2 | 10/2003 | Ohashi et al. |
| 6,646,578 B1 | 11/2003 | Au |
| 6,650,784 B2 | 11/2003 | Thyagarajan |
| 6,653,952 B2 | 11/2003 | Hayami et al. |
| 6,678,419 B1 * | 1/2004 | Malvar ............... 382/240 |
| 6,704,360 B2 | 3/2004 | Haskell et al. |
| 6,721,700 B1 | 4/2004 | Yin |
| 6,728,317 B1 | 4/2004 | Demos |
| 6,735,339 B1 | 5/2004 | Ubale |
| 6,766,293 B1 | 7/2004 | Herre |
| 6,771,777 B1 | 8/2004 | Gbur |
| 6,795,584 B2 | 9/2004 | Karczewicz et al. |
| 6,825,847 B1 | 11/2004 | Molnar et al. |
| 6,829,299 B1 | 12/2004 | Chujoh et al. |
| 6,934,677 B2 | 8/2005 | Chen et al. |
| 6,954,157 B2 * | 10/2005 | Kadono et al. ............... 341/67 |
| 7,016,547 B1 | 3/2006 | Smirnov |
| 7,076,104 B1 | 7/2006 | Keith et al. |
| 7,107,212 B2 | 9/2006 | Van Der Vleuten et al. |
| 7,139,703 B2 | 11/2006 | Acero et al. |
| 7,143,030 B2 | 11/2006 | Chen et al. |
| 7,165,028 B2 | 1/2007 | Gong |
| 7,328,150 B2 | 2/2008 | Chen et al. |
| 7,433,824 B2 | 10/2008 | Mehrotra et al. |
| 7,454,076 B2 | 11/2008 | Chen et al. |
| 7,460,990 B2 | 12/2008 | Mehrotra et al. |
| 7,502,743 B2 | 3/2009 | Thumpudi et al. |
| 7,536,305 B2 | 5/2009 | Chen et al. |
| 7,546,240 B2 | 6/2009 | Mehrotra et al. |
| 7,562,021 B2 | 7/2009 | Mehrotra et al. |
| 7,599,840 B2 | 10/2009 | Mehrotra et al. |
| 7,630,882 B2 | 12/2009 | Mehrotra et al. |
| 7,684,981 B2 | 3/2010 | Thumpudi et al. |
| 7,693,709 B2 | 4/2010 | Thumpudi et al. |
| 7,756,350 B2 | 7/2010 | Vos et al. |
| 7,761,290 B2 | 7/2010 | Koishida et al. |
| 7,822,601 B2 | 10/2010 | Mehrotra et al. |
| 7,840,403 B2 | 11/2010 | Mehrotra et al. |
| 2002/0009145 A1 | 1/2002 | Natarajan et al. |
| 2002/0031185 A1 | 3/2002 | Webb |
| 2002/0111780 A1 | 8/2002 | Sy |
| 2003/0006917 A1 | 1/2003 | Ohashi et al. |
| 2003/0033143 A1 | 2/2003 | Aronowitz |
| 2003/0085822 A1 | 5/2003 | Scheuermann |
| 2003/0115055 A1 | 6/2003 | Gong |
| 2003/0138150 A1 | 7/2003 | Srinivasan |
| 2003/0156648 A1 | 8/2003 | Holcomb et al. |
| 2003/0210163 A1 | 11/2003 | Yang |
| 2004/0044521 A1 | 3/2004 | Chen et al. |

| | | | |
|---|---|---|---|
| 2004/0044534 | A1 | 3/2004 | Chen et al. |
| 2004/0049379 | A1 | 3/2004 | Thumpudi et al. |
| 2004/0114810 | A1 | 6/2004 | Boliek |
| 2004/0136457 | A1 | 7/2004 | Funnell et al. |
| 2004/0184537 | A1 | 9/2004 | Geiger et al. |
| 2004/0196903 | A1 | 10/2004 | Kottke et al. |
| 2005/0015249 | A1 | 1/2005 | Mehrotra et al. |
| 2005/0021317 | A1 | 1/2005 | Weng et al. |
| 2005/0052294 | A1 | 3/2005 | Liang et al. |
| 2005/0286634 | A1 | 12/2005 | Duvivier |
| 2006/0023792 | A1 | 2/2006 | Cho et al. |
| 2006/0078208 | A1 | 4/2006 | Malvar |
| 2006/0088222 | A1 | 4/2006 | Han et al. |
| 2006/0104348 | A1 | 5/2006 | Chen et al. |
| 2006/0153304 | A1 | 7/2006 | Prakash et al. |
| 2006/0176959 | A1 | 8/2006 | Lu et al. |
| 2006/0268990 | A1 | 11/2006 | Lin et al. |
| 2006/0285760 | A1 | 12/2006 | Malvar |
| 2007/0116369 | A1 | 5/2007 | Zandi et al. |
| 2007/0200737 | A1 | 8/2007 | Gao et al. |
| 2007/0242753 | A1 | 10/2007 | Jeon et al. |
| 2008/0043030 | A1 | 2/2008 | Huang et al. |
| 2008/0089421 | A1 | 4/2008 | Chang et al. |
| 2008/0262855 | A1 | 10/2008 | Mehrotra et al. |
| 2008/0317364 | A1 | 12/2008 | Gou et al. |

FOREIGN PATENT DOCUMENTS

| | | |
|---|---|---|
| EP | 0 663 773 | 7/1995 |
| EP | 0 910 927 | 1/1998 |
| EP | 0 966 793 | 9/1998 |
| EP | 0 931 386 | 1/1999 |
| EP | 1 142 130 | 4/2003 |
| EP | 1 400 954 | 3/2004 |
| EP | 1 142 129 | 6/2004 |
| GB | 2 372 918 | 9/2002 |
| GB | 2 388 502 | 11/2003 |
| JP | 01-125028 | 5/1989 |
| JP | 03-108824 | 5/1991 |
| JP | 5-199422 | 6/1993 |
| JP | 5-292481 | 11/1993 |
| JP | 6-021830 | 1/1994 |
| JP | 6-217110 | 8/1994 |
| JP | 07-087331 | 3/1995 |
| JP | 07-273658 | 10/1995 |
| JP | 7-274171 | 10/1995 |
| JP | 08-116263 | 5/1996 |
| JP | 08-167852 | 6/1996 |
| JP | 08-190764 | 7/1996 |
| JP | 08-205169 | 8/1996 |
| JP | 08-237138 | 9/1996 |
| JP | 11-041573 | 2/1999 |
| JP | 2000-338998 | 12/2000 |
| JP | 2001-500640 | 1/2001 |
| JP | 2002-158589 | 5/2002 |
| JP | 2002 204170 | 7/2002 |
| WO | WO 88/01811 | 3/1988 |
| WO | WO 98/00924 | 1/1998 |
| WO | WO 00/36752 | 6/2000 |
| WO | WO 00/36754 | 6/2000 |
| WO | WO 02/35849 | 5/2002 |

OTHER PUBLICATIONS

Brandenburg et al., "ASPEC: Adaptive Spectral Entropy Coding of High Quality Music Signals," *Proc. AES*, 12 pp. (Feb. 1991).
Brandenburg, "OCF: Coding High Quality Audio with Data Rates of 64 kbit/sec," *Proc. AES*, 17 pp. (Mar. 1988).
Brandenburg, "High Quality Sound Coding at 2.5 Bits/Sample," *Proc. AES*, 15 pp. (Mar. 1988).
Brandenburg et al., "Low Bit Rate Codecs for Audio Signals: Implementations in Real Time," *Proc. AES*, 12 pp. (Nov. 1988).
Brandenburg et al., "Low Bit Rate Coding of High-quality Digital Audio: Algorithms and Evaluation of Quality," *Proc. AES*, pp. 201-209 (May 1989).
Brandenburg, "OCF—A New Coding Algorithm for High Quality Sound Signals," *Proc. ICASSP*, pp. 5.1.1-5.1.4 (May 1987).
Brandenburg et al, "Second Generation Perceptual Audio Coding: the Hybrid Coder," *AES Preprint*, 13 pp. (Mar. 1990).

Duhamel et al., "A Fast Algorithm for the Implementation of Filter Banks Based on Time Domain Aliasing Cancellation," *Proc. Int'l Conf. Acous., Speech, and Sig. Process*, pp. 2209-2212 (May 1991).
International Search Report and Written Opinion dated Jan. 12, 2010, for Application No. PCT/US2009/039089, 8 pp.
Iwadare et al., "A 128 kb/s Hi-Fi Audio CODEC Based on Adaptive Transform Coding with Adaptive Block Size MDCT," *IEEE. J. Sel. Areas in Comm.*, pp. 138-144 (Jan. 1992).
Johnston, "Perceptual Transform Coding of Wideband Stereo Signals," *Proc. ICASSP*, pp. 1993-1996 (May 1989).
Johnston, "Transform Coding of Audio Signals Using Perceptual Noise Criteria," *IEEE J. Sel. Areas in Comm.*, pp. 314-323 (Feb. 1988).
Mahieux et al., "Transform Coding of Audio Signals at 64 kbits/sec," *Proc. Globecom*, pp. 405.2.1-405.2.5 (Nov. 1990).
Princen et al., "Analysis/Synthesis Filter Bank Design Based on Time Domain Aliasing Cancellation," *IEEE Trans. ASSP*, pp. 1153-1161 (Oct. 1986).
Schroder et al., "High Quality Digital Audio Encoding with 3.0 Bits/Semple using Adaptive Transform Coding," *Proc. 80th Conv. Aud. Eng. Soc.*, 8 pp. (Mar. 1986).
Theile et al., "Low-Bit Rate Coding of High Quality Audio Signals," *Proc. AES*, 32 pp. (Mar. 1987).
ISO/IEC, "Lossless and Near-lossless Coding of Continuous Tone Still Images (JPEG-LS)," JTC1/SC29/WG1 FCD 14495, 79 pp. (1997).
Marpe et al., "Adaptive Codes for H.26L," ITU Study Group 16—Video Coding Experts Group—ISO/IEC MPEG & ITU-T VCEG (ISO/IEC JTC1/SC29/WG11 and ITU-T SG16 Q6), No. VCEG-L13, 7 pages, Jan. 8, 2001.
U.S. Appl. No. 60/488,710, filed Jul. 18, 2003, Srinivasan et al.
Alberto Del Bimbo, "Progettazione e Produzione Multimediale," *Univ. degli Studi di Firenze*, 51 pp., downloaded from the World Wide Web.
Davidson et al., "Still Image Coding Standard—JPEG," *Helsinki University of Technology*, 24 pages, downloaded from the World Wide Web (2004).
Murray and Van Ryper, "JPEG compression," *Encyclopedia of Graphics File Formats*, $2^{nd}$ Edition, Chapter 9, Section 6, 10 pp., downloaded from the World Wide Web (1996).
Bell et al., "Text Compression," *Prentice Hall*, pp. 105-107, 1990.
Davis, "The AC-3 Multichannel Coder," *Dolby Laboratories Inc.*, Audio Engineering Study, Inc., Oct. 1993.
U.S. Appl. No. 60/341,674, filed Dec. 2001, Lee et al.
U.S. Appl. No. 60/488,710, filed Jul. 2003, Srinivasan et al.
Advanced Television Systems Committee, "ATSC Standard: Digital Audio Compression (AC-3), Revision A," 140 pp. (1995).
Bosi et al., "ISO/IEC MPEG-2 Advance Audio Coding," *J. Audio Eng. Soc.*, vol. 45, No. 10, pp. 789-812 (1997).
Brandenburg, "ASPEC Coding," *AES 10th International Conference*, pp. 81-90 (1991).
Chiang et al., "A Radix-2 Non-Restoring 32-b/32-b Ring Divider with Asynchronous Control Scheme," *Tamkang Journal of Science and Engineering*, vol. 2, No. 1, pp. 37-43 (1999).
Chung et al., "A Novel Memory-efficient Huffman Decoding Algorithm and its Implementation," *Signal Processing* 62, pp. 207-213 (1997).
Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).
Cui et al., "A novel VLC based on second-run-level coding and dynamic truncation," *Proc. SPIE*, vol. 6077, pp. 607726-1 to 607726-9 (2006).
De Agostino et al., "Parallel Algorithms for Optimal Compression using Dictionaries with the Prefix Property," *Proc. Data Compression Conference '92, IEEE Computer Society Press*, pp. 52-62 (1992).
Gailly, "comp.compression Frequently Asked Questions (part 1/3)," 64 pp., document marked Sep. 5, 1999 [Downloaded from the World Wide Web on Sep. 5, 2007].
Gersho et al., "Vector Quantization and Signal Compression," pp. 259-305 (1992).

Gibson et al., *Digital Compression for Multimedia,* "Chapter 2: Lossless Source Coding," Morgan Kaufmann Publishers, Inc., San Francisco, pp. 17-61 (1998).

Gibson et al., *Digital Compression for Multimedia,* "Chapter 7: Frequency Domain Morgan Coding," Morgan Kaufmann Publishers, Inc., pp. 227-262 (1998).

Gill et al., "Creating High-Quality Content with Microsoft Windows Media Encoder 7," 4 pp. (2000) [Downloaded from the World Wide Web on May 1, 2002].

Hui et al., "Matsushita Algorithm for Coding of Moving Picture Information," ISO/IEC-JTC1/SC29/WG11, MPEG91/217, 76 pp. (Nov. 1991).

International Search Report and Written Opinion for PCT/US06/30566 dated Sep. 28, 2007.

Joint Video Team (JVT) of ISO/IEC MPEG & ITU-T VCEG, "Draft ITU-T Recommendation and Final Draft International Standard of Joint Video Specification (ITU-T Rec. H.264, ISO/IEC 14496-10 AVC)," 253 pp. (May 2003).

Li et al., "Optimal Linear Interpolation Coding for Server-Based Computing," *Proc. IEEE Int'l Conf. on Communications,* 5 pp. (Apr.-May 2002).

Malvar, "Fast Progressive Image Coding without Wavelets", IEEE Data Compression Conference, Snowbird, Utah, 10 pp. (Mar. 2000).

Matthias, "An Overview of Microsoft Windows Media Screen Technology," 3 pp. (2000) [Downloaded from the World Wide Web on May 1, 2002].

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews,* 18 pp. (Jul. 2002) [Downloaded from the World Wide Web on Mar. 16, 2004].

Najafzadeh-Azghandi, "Perceptual Coding of Narrowband Audio Signals," Thesis, 139 pp. (Apr. 2000).

Nelson, *The Data Compression Book,* "Huffman One Better: Arithmetic Coding," Chapter 5, pp. 123-165 (1992).

OPTX International, "OPTX Improves Technology-Based Training with Screen Watch™ 3.0. Versatile Screen Capture Software Adds High Color and Live Webcast Support," 1 p., document marked Feb. 15, 2001 [Downloaded from the World Wide Web on Sep. 22, 2005].

OPTX International, "OPTX International Marks One Year Anniversary of Screen Watch With Release of New 2.0 Version," 1 p., document marked May 16, 2000 [Downloaded from the World Wide Web on Sep. 22, 2005].

OPTX International, "New Screen Watch™ 4.0 Clikc and Stream™ Wizard from OPTX International Makes Workplace Communication Effortless," 1 p., document marked Sep. 24, 2001 [Downloaded from the World Wide Web on Sep. 22, 2005].

Palmer et al., "Shared Desktop: A Collaborative Tool for Sharing 3-D Applications Among Different Window Systems," *Digital Tech. Journal,* vol. 9, No. 3, pp. 42-49 (1997).

Printouts of FTP directories from http://ftp3.itu.ch, 8 pp. [Downloaded from the World Wide Web on Sep. 20, 2005].

International Search Report and Written Opinion for PCT/US06/30563, dated Oct. 17, 2007, 8 pages.

Ishii et al., "Parallel Variable Length Decoding with Inverse Quantization for Software MPEG-2 Decoders," IEEE Signal Processing Systems, pp. 500-509 (1997).

ISO/IEC, "ISO/IEC 11172-2, Information Technology—Coding of Moving Pictures and Associated Audio for Digital Storage Media at up to About 1.5 Mbit/s—Part 2: Video," 112 pp. (1993).

"ISO/IEC 11172-3, Information Technology—Coding of Moving Pictures and Associated Audio for Digital Storage Media at Up to About 1.5 Mbit/s—Part 3: Audio," 154 pp. (1993).

"ISO/IEC 13818-7, Information Technology—Generic Coding of Moving Pictures and Associated Audio Information—Part 7: Advanced Audio Coding (AAC)," 174 pp. (1997).

ISO/IEC 14496-2, "Coding of Audio-Visual Object—Part 2: Visual," Third Edition, pp. 1-727, (Jun. 2004).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at $p \times 64$ kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Jeong et al., "Adaptive Huffman Coding of 2-D DCT Coefficients for Image Sequence Compression," Signal Processing: Image Communication, vol. 7, 11 pp. (1995).

Joint Video Team (JVT) of ISO/IEC MPEG & ITU-T VCEG, "Joint Final Committee Draft (JFCD) of Joint Video Specification," JVT-D157, 207 pp. (Aug. 2002).

Reader, "History of MPEG Video Compression—Ver. 4.0," 99 pp., document marked Dec. 16, 2003.

Schaar-Mitrea et al., "Hybrid Compresion of Video with Graphics in DVT Communication Systems," *IEEE Trans. on Consumer Electronics,* pp. 1007-1017 (2000).

Shamoon et al., "A Rapidly Adaptive Lossless Compression Algorithm for High Fidelity Audio Coding," *IEEE Data Compression Conf.,* pp. 430-439 (Mar. 1994).

Sullivan et al., "The H.264/AVC Advanced Video Coding Standard: Overview and Introduction to the Fidelity Range Extensions," 21 pp. (Aug. 2004).

Techsmith Corporation, "Techsmith Camtasia Screen Recorder SDK," 2 pp. (2001).

Techsmith Corporation, "Camtasia Feature of the Week: Quick Capture," 2 pp., document dated Jan. 4, 2001 [Downloaded from the World Wide Web on May 9, 2002].

Techsmith Corporation, "Camtasia Screen Recorder SDK DLL API User Guide," Version 1.0, 66 pp. (2001).

Techsmith Corporation, "Camtasia v.3.0.1—README.TXT," 19 pp. (Jan. 2002).

Tu et al., "Context-Based Entropy Coding of Block Transform Coefficients for Image Compression," *IEEE Transactions on Image Processing,* vol. 11, No. 11, pp. 1271-1283 (Nov. 2002).

Wien et al., "16 Bit Adaptive Block Size Transforms," JVT-C107r1, 54 pp.

Wien, "Variable Block-Size Transforms for Hybrid Video Coding," Dissertation, 182 pp. (Feb. 2004).

\* cited by examiner

Figure 1

| 25 | 12 | 0 | 0 | 0 | 0 | 0 | 0 |
|---|---|---|---|---|---|---|---|
| 0 | -5 | 0 | 0 | 0 | 0 | 0 | 0 |
| 0 | 0 | 0 | 0 | 0 | 0 | 0 | 2 |
| 0 | 0 | 0 | 0 | 0 | 0 | -1 | 1 |
| 0 | 0 | 0 | 0 | 0 | 0 | -1 | 1 |
| 0 | 0 | 0 | 0 | 0 | 0 | 1 | 1 |
| 0 | 0 | 0 | 0 | 0 | 0 | 0 | 0 |
| 0 | 0 | 0 | 0 | 0 | 0 | 0 | 0 | transform coefficients 100

Figure 2

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 | prior art zigzag scan order 200 reordering coefficients 100 according to scan order 1D series of transform coefficients 250

25, 12, 0(x2), -5, 0(x38), 2, -1, 0(x7), -1, 1, 1, 1, 0(x4), 1, EOB software 380 implementing encoding and/or decoding of a nested set representation of reordered frequency coefficients.

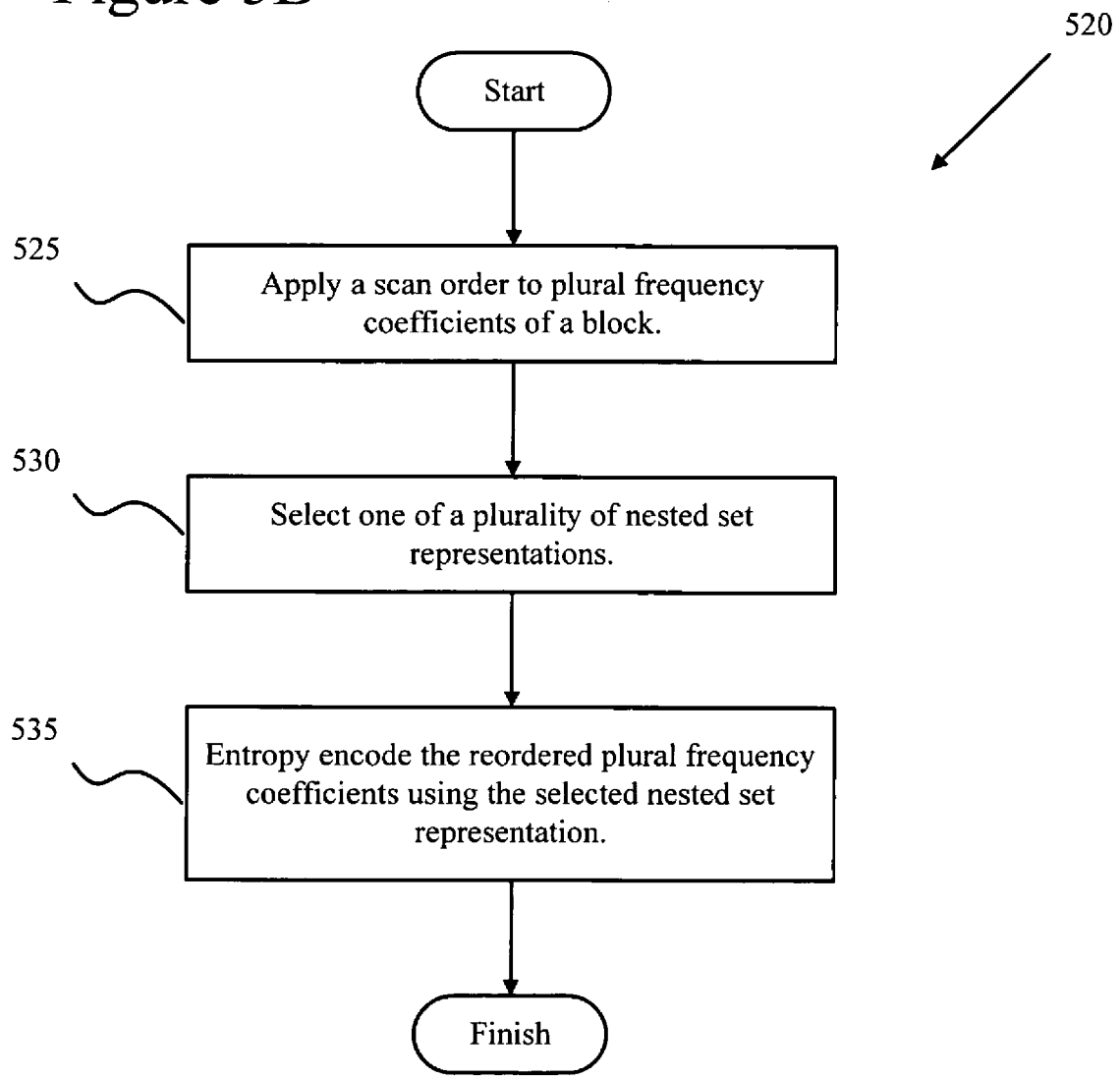

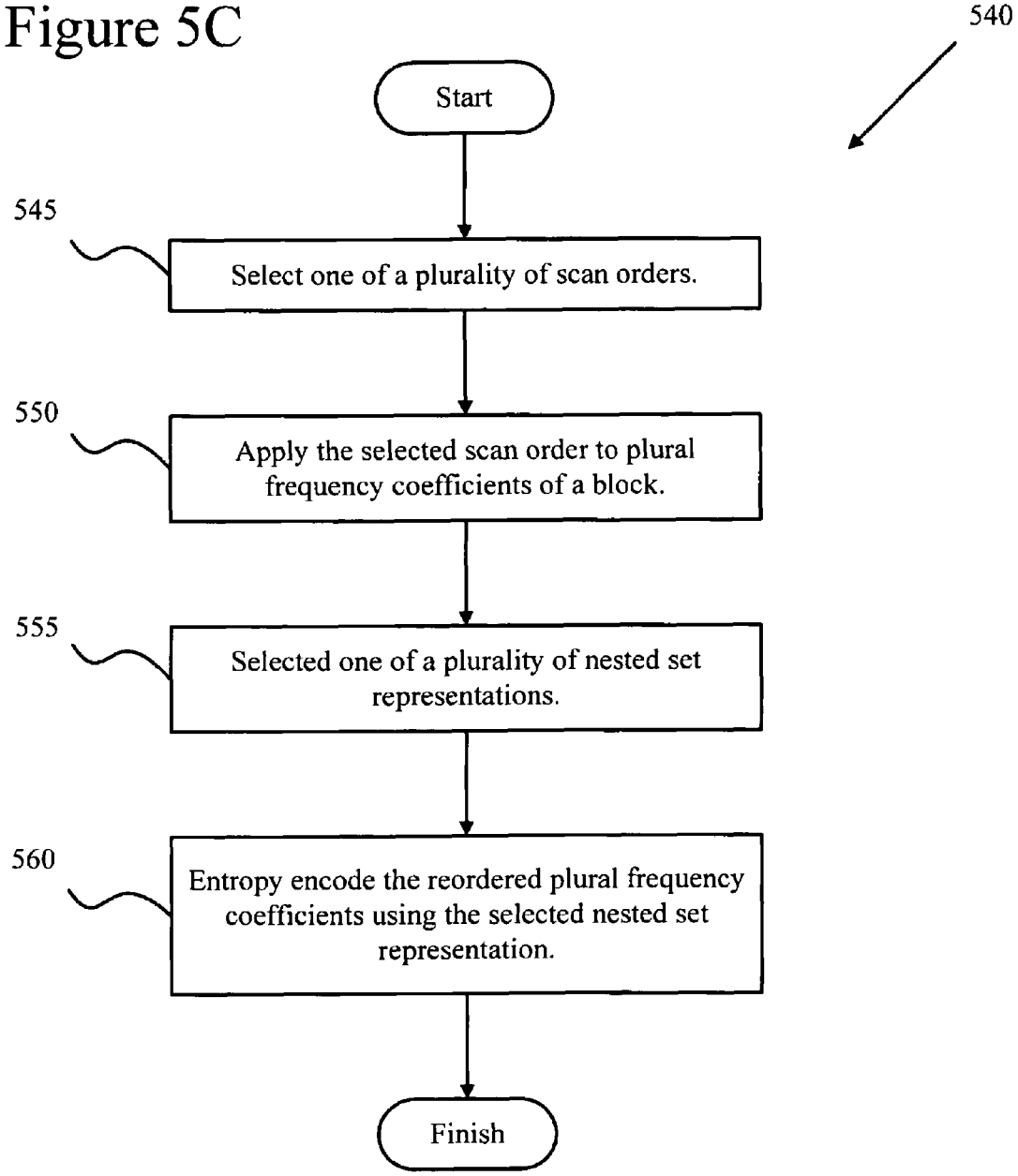

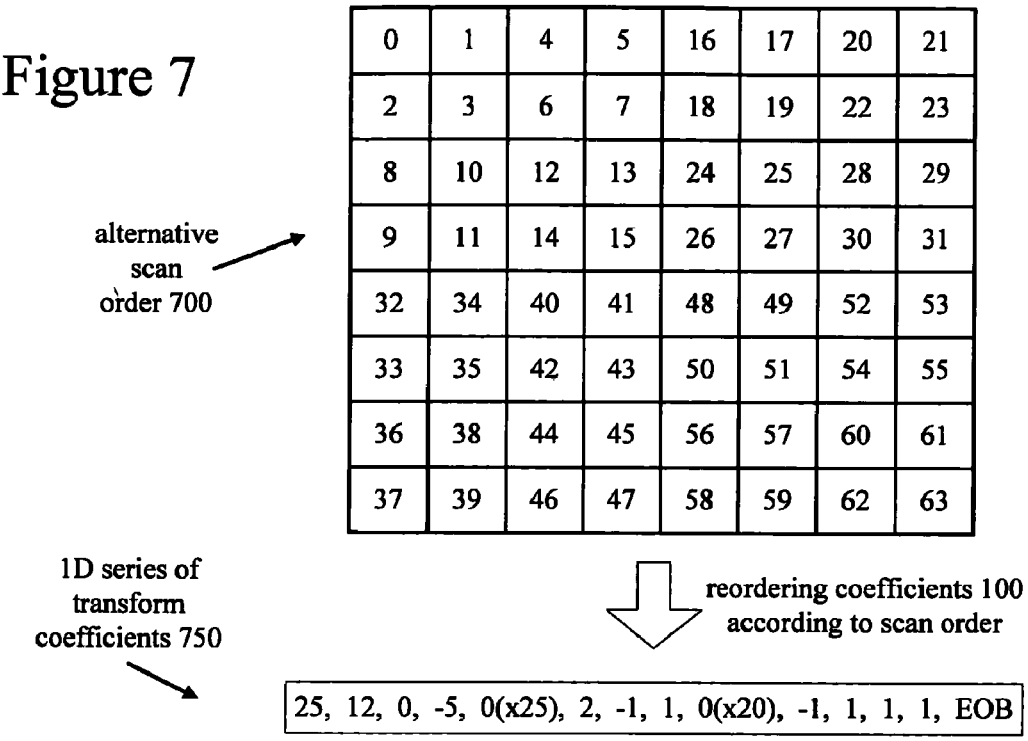
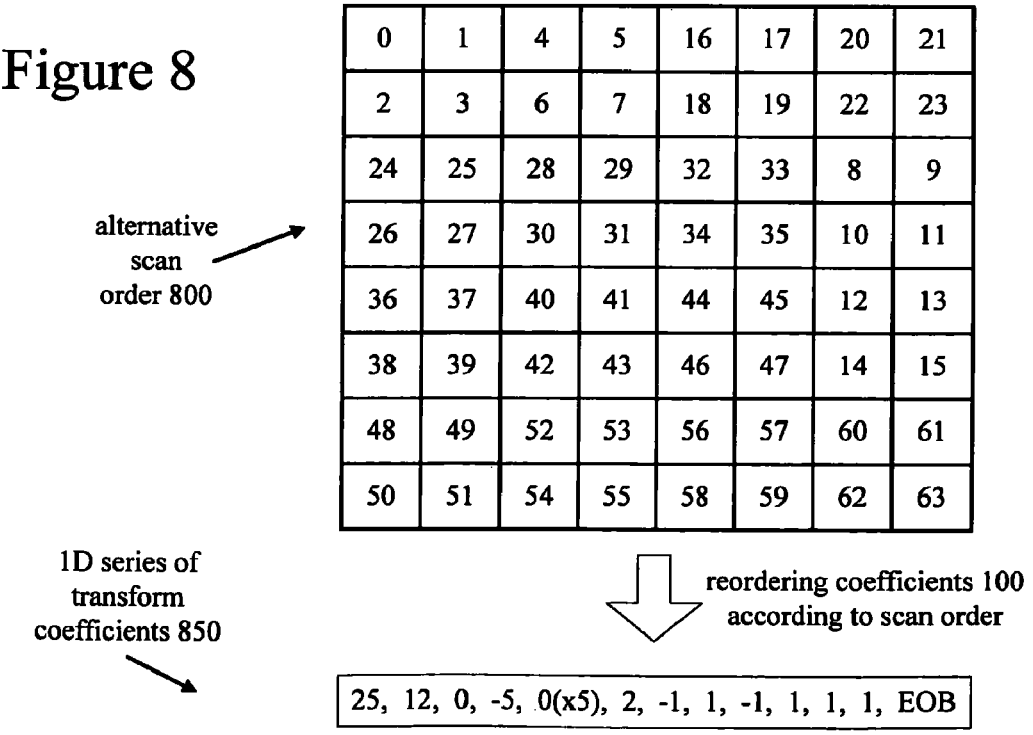

NumOfNonDefaultScanOrders;   // 4 bits: number of non-default scan orders (0 – 15)

For(i = 0; i < NumOfNonDefaultScanOrders; i ++) // specify each non-default scan order
   for(j = 0; j < 64; j ++){   // loop through all 64 positions
      DefaultIdx;   // 1 bit: scan order index is the same as default?

if(DefaultIdx)
       ScanOrder[i][j] = DefaultScanOrder[j];   // use default index for non-default scan order
     else
       ScanOrder[i][j];                       // 6 bits: signal index (0 – 63) for non-default scan order
}

UseDefaultOrder;   // 1 bit: use default scan order?

NewScanOrder = FALSE;

if(UseDefaultOrder)
   CurrentScanOrder = DefaultScanOrder;
else if(NumOfNonDefaultScanOrders > 0){
   UsePredefinedNonDefaultScanOrder;   // 1 bit: use a non-default order from sequence header?

if(UsePredefinedNonDefaultScanOrder){   // use predefined order
      OrderIdx;                       // which one is used
      CurrentScanOrder = NonDefaultScanOrder[OrderIdx];
   }
   else   // need to define new scan order
      NewScanOrder = TRUE;
}
else   // no predefined order, need to define a new one
   NewScanOrder = TRUE;

If(NewScanOrder
   for(i = 0; i < 64; i ++){   // loop through all 64 positions
      DefaultIdx;   // 1 bit: scan order index is the same as default?

if(DefaultIdx)
       CurrentScanOrder[i] = DefaultScanOrder[i];   // use default index for new scan order
     else
       CurrentScanOrder[i];                       // 6 bits: signal index (0 – 63) for new scan order
}

MULTI-LEVEL REPRESENTATION OF REORDERED TRANSFORM COEFFICIENTS

BACKGROUND

When a picture such as a frame of video or a still image is encoded, an encoder typically splits the visual data into blocks of sample values. The encoder performs a frequency transform such as a discrete coefficient transform (DCT) to convert the block of sample values into a block of transform coefficients. The transform coefficient by convention shown at the upper left of the block is generally referred to as the DC coefficient, and the other coefficients are generally referred to as the AC coefficients. For most blocks of sample values, a frequency transform tends to group non-zero values of the transform coefficients towards the upper-left, lower frequency section of the block of transform coefficients.

After the frequency transform, the encoder quantizes the transform coefficient values. The quantization generally reduces the number of possible values for the DC and AC coefficients. This usually reduces resolution as well as fidelity of the quantized values to the original coefficient values, but it makes subsequent entropy encoding more effective. The quantization also tends to "remove" the higher frequency coefficients (generally grouped in the lower right side of the block), when the higher frequency coefficients have low amplitudes that are quantized to zero.

FIG. 1 shows one example of an 8×8 block (100) of transform coefficients after quantization. In this exemplary block (100), the value 25 in the upper left corner of the block is the DC coefficient, and the other 63 values are the AC coefficients. Although the highest-amplitude coefficients in the block (100) are the low frequency coefficients in the upper left, along the right side, the block includes a cluster of non-zero coefficient values at higher frequencies.

After the transform coefficients have been quantized, the encoder entropy encodes the quantized transform coefficients. One common method of encoding a block of transform coefficients starts by reordering the block using a "zig-zag" scan order (200) as shown in FIG. 2. In this method, the encoder maps the values of the transform coefficients from a two-dimensional array into a one-dimensional string according to the scan order (200). The scan order (200) begins in the top left of the block (100) with the DC coefficient, traverses the AC coefficients of the block (100) at positions 1 and 2, traverses the AC coefficients at positions 3, 4, and 5, and so on. The scanning continues diagonally across the block (100) according to the scan order (200), finishing in the lower right corner of the block (100) with the highest frequency AC coefficient at position 63. Because the quantization operation typically quantizes to zero a significant portion of the lower-value, higher-frequency coefficients, while preserving non-zero values for the higher-value, lower-frequency coefficients, zigzag scan reordering commonly results in most of the remaining non-zero transform coefficients being near the beginning of the one-dimensional string and a large number of zero values being at the end of the string.

FIG. 2 shows an exemplary one-dimensional string (250) that results from applying the scan order (200) to the block (100) of transform coefficients. In this example, the one-dimensional string (250) starts with the value 25 corresponding to the DC coefficient of the block (100). The scan order then reads the value 12, followed by two values of 0, a value of −52, and so on. The symbol "EOB" signifies "End of Block" and indicates that all of the remaining values in the block are 0.

The encoder then entropy encodes the one-dimensional vector of coefficient values using run length coding or run level coding. In run level coding, the encoder traverses the one-dimensional vector, encoding each run of consecutive zero values as a run count, and encoding each non-zero value as a level. For simple encoding, the encoder assigns variable length codes such as Huffman codes to the run counts and level values.

One problem with the simple encoding is that the run count can vary from 0 to 64, requiring an alphabet of 65 codes just for the run count. If the encoder jointly encodes a run count with a subsequent non-zero level value (to take advantage of correlation between run count and level values), the size of the run count-level alphabet is much larger, which increases the complexity of the entropy encoding (e.g., due to code table sizes and lookup operations). Using escape codes for less frequent combinations helps control code table size but can decrease coding efficiency.

Another problem with run-level coding arises when the encoder uses the same possible code values for run-level combinations regardless of which AC coefficients are being encoded. If the chance of encountering a long run of zero values increases for higher frequency AC coefficients, using the same possible code values for run-level combinations hurts efficiency.

Finally, reordering using the zigzag scan order (200) shown in FIG. 2 can, in some cases, hurt encoding efficiency. In general, neighboring coefficient values within a block are correlated—if a transform coefficient value is zero, its neighbors are more likely to be zero, and if a transform coefficient value is non-zero, its neighbors are more likely to be non-zero. Reordering using the zigzag scan order (200) in some cases separates neighboring coefficient positions (e.g., positions 15 and 27) in the one-dimensional vector. For example, although the non-zero coefficients in the block (100) in FIG. 1 appear in two clusters, the non-zero coefficient values in the one-dimensional string (250) of FIG. 2 are interrupted 4 times by a series of one or more "0" values.

Given the critical importance of encoding and decoding to digital video, it is not surprising that video encoding and decoding are richly developed fields. Whatever the benefits of previous video encoding and decoding techniques, however, they do not have the advantages of the following techniques and tools.

SUMMARY

In summary, the detailed description presents techniques and tools for encoding and decoding blocks of frequency coefficients. For example, the techniques and tools improve the performance of an encoder by improving the compression of blocks of frequency coefficients. The efficiency of the compression is increased by grouping non-zero values of the frequency coefficients together within a one-dimensional string and then entropy encoding the coefficient values according to a multi-level nested set representation.

In one embodiment a tool, such as an encoding tool, selects one of multiple scan orders and applies the selected scan order to reorder frequency coefficients of a block. The tool entropy encodes the reordered frequency coefficients using a multi-level nested set representation of the reordered frequency coefficients. This includes representing a first set of one or more of the reordered frequency coefficients in a summary representation as a first symbol at a first level of the multi-resolution representation, and entropy encoding the first symbol and a second symbol at the first level of the multi-resolution representation. In some cases, the tool further represents a first sub-set of one or more of the reordered frequency coefficients of the first set in a summary representation as a first sub-symbol at a second level of the nested-set representation, and the tool entropy encodes the first sub-symbol.

In another embodiment a tool, such as a decoding tool, reconstructs entropy encoded video by entropy decoding video information from a bit stream. The tool decodes a first symbol and a second symbol at a first level of a multi-level nested-set representation of frequency coefficients. The first symbol represents a first set of one or more of the frequency coefficients, and the second symbol represents a second set of one or more of the frequency coefficients. Next, the tool decodes a first sub-symbol at a second level of the multi-level nested-set representation. The sub-symbol represents a first subset of one or more of the frequency coefficients of the first set. The tool then determines a scan order for the frequency coefficients, reorders the coefficients according to the scan order, and uses the coefficients to reconstruct the video.

In some implementations, an encoding tool uses Huffman coding for entropy encoding, and a decoding tool uses corresponding Huffman decoding. In other implementations, the encoding tool uses run level coding or another variation of run length coding, and the decoding tool uses corresponding decoding. In some implementations, the encoding and decoding tools select the scan order for a block from among multiple pre-determined scan orders. In other implementations, the encoding tool determines a new scan order if none of the pre-determined scan orders produces suitable compression of the transform coefficients.

The foregoing and other objects, features, and advantages of the invention will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 1 is a chart illustrating an exemplary block of quantized transform coefficients.

FIG. 2 includes a chart illustrating a prior art zigzag scan order and also shows the results of applying the zigzag scan order to the block of transform coefficients from FIG. 1.

FIGS. 5A-C are flowcharts illustrating different generalized techniques for selecting a scan order and encoding a picture using a multi-level nested set representation.

FIGS. 7 and 8 include charts illustrating example scan orders and also show the results of applying the respective scan orders to the block of transform coefficients from FIG. 1.

FIGS. 9A and 9B are pseudocode listings illustrating signaling of scan order selections.

DETAILED DESCRIPTION

The following detailed description presents tools and techniques for encoding a set of frequency coefficients by reordering them according to a scan order to convert the values of the frequency coefficients into a one-dimensional string of values. The string of values is encoded according to an entropy encoding method using a multi-level nested set representation. The following detailed description also presents corresponding tools and techniques for decoding a set of frequency coefficients.

Some of the techniques and tools described herein address one or more of the problems noted in the background. Typically, a given technique/tool does not solve all such problems. Rather, in view of constraints and tradeoffs in encoding time, encoding resources, decoding time, decoding resources and/or quality, the given technique/tool improves encoding and/or performance for a particular implementation or scenario.

I. Computing Environment.

Figure 3:
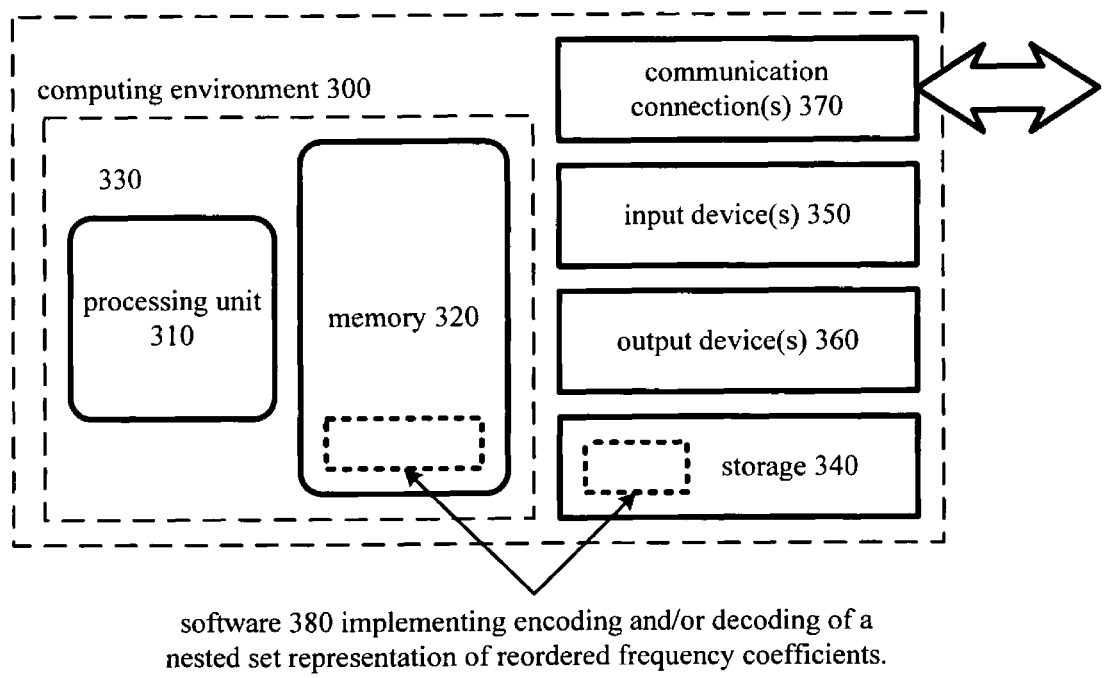
FIG. 3 is a block diagram of a suitable computing environment in which several described embodiments may be implemented.

FIG. 3 illustrates a generalized example of a suitable computing environment (300) in which several of the described embodiments may be implemented. The computing environment (300) is not intended to suggest any limitation as to scope of use or functionality, as the techniques and tools may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing an encoder with one or more of the described techniques and tools for encoding and/or decoding a nested set representation of reordered frequency coefficients.

A computing environment may have additional features. For example, the computing environment (300) includes storage (340), one or more input devices (350), one or more output devices (360), and one or more communication connections (370). An interconnection mechanism not shown such as a bus, controller, or network interconnects the components of the computing environment (300). Typically, operating system software not shown provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing the video encoder and/or decoder.

The input device(s) (350) may be a touch input device such as a keyboard, mouse, pen, or trackball, a voice input device, a scanning device, or another device that provides input to the computing environment (300). For audio or video encoding, the input device(s) (350) may be a sound card, video card, TV tuner card, or similar device that accepts audio or video input in analog or digital form, or a CD-ROM or CD-RW that reads audio or video samples into the computing environment (300). The output device(s) (360) may be a display, printer, speaker, CD-writer, or another device that provides output from the computing environment (300).

The communication connection(s) (370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "reconstruct" to describe computer operations in a computing environment. These terms are high-level abstractions for operations performed by a computer, and should not be confused with acts performed by a human being. The actual computer operations corresponding to these terms vary depending on implementation.

Figure 4:
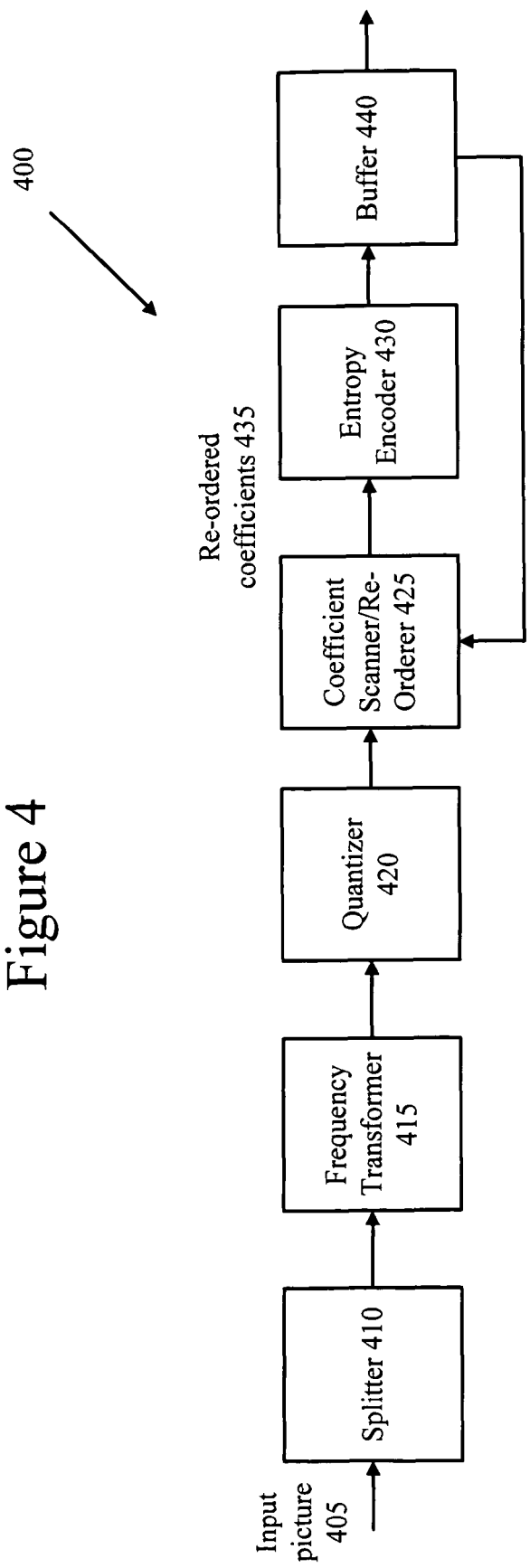
FIG. 4 is a block diagram of a generalized encoding tool operable to select a scan order and encode a picture using a multi-level nested set representation of blocks.

II. A Generalized Encoding Tool for a Nested Set Representation of Reordered Frequency Coefficients FIG. 4 illustrates a block diagram of a generalized encoding tool (400) in which embodiments of this disclosure can be implemented. The tool (400) receives an input picture (405) in a sequence. The term picture generally refers to source, coded, or reconstructed image data. For progressive video, a picture is a progressive video frame. For interlaced video, a picture may refer to an interlaced video frame, the top field of the frame, or the bottom field of the frame, depending on context. The input picture (405) can be a whole frame of video or a static picture, or the input picture can be just a portion of a frame of video or a portion of a static picture. Alternatively, the input picture (405) can comprise only one color component of a downsampled picture, for example the luma component of a YCbCr picture.

For the sake of simplicity, FIG. 4 does not show modules of the encoding tool (400) that relate to motion estimation, motion compensation, and other motion processing. In some implementations, in addition to processing blocks of sample values for intra-picture compression, the tool (400) processes blocks of sample values of motion-compensation residuals using the modules shown in FIG. 4. For a given residual block, the tool performs a frequency transform, quantization, scan reordering and entropy encoding of the frequency coefficient values of the residual block.

In FIG. 4, for intra-picture compression, a splitter (410) splits the input picture (405) into a series of blocks each containing a plurality of sample values. For an 8×8 block, each block comprises 64 sample values arranged in eight rows and eight columns. Alternatively, the blocks can be 4×4, 4×8, 8×4, 16×16, or some other size.

A frequency transformer (415) converts the blocks of transform coefficients into frequency domain (i.e., spectral, transform) data. The frequency transformer (415) applies a DCT, variant of DCT, or other frequency transform to the blocks of sample values, producing blocks of frequency transform coefficients. The frequency transformer (415) may apply an 8×8, 8×4, 4×8, 4×4 or other size frequency transform.

A quantizer (420) then quantizes the blocks of transform coefficients. The quantizer (420) applies non-uniform, scalar quantization to the spectral data with a step size that varies on a picture-by-picture basis, block-by-block basis, or other basis. The quantizer (420) can also apply another type of quantization to the spectral data coefficients, for example, a uniform or adaptive quantization for at least some of the coefficients, or directly quantizes spatial domain data in an encoder system that does not use frequency transformations.

A coefficient scanner/re-orderer (425) scans the quantized coefficients and re-orders them in a one-dimensional string according to a scan order. An entropy encoder (430) encodes the coefficients in the one-dimensional string. For example, the entropy encoder (430) encodes the transform coefficients using adaptive Huffman coding. Alternatively, the entropy encoder can encode the transform coefficients using run-length coding, run-level coding, or some other entropy encoding method. The entropy encoder (430) outputs the entropy encoded coefficient values (435) to a buffer (440).

In some embodiments the tool (400) uses any of multiple scan orders available to the coefficient scanner (425). For example, the tool (400) switches between the scan order (200) in FIG. 2, the scan order (700) in FIG. 7, the scan order (800) in FIG. 8, and one or more other scan orders. The tool (400) selects between the available scan orders on a block-by-block basis, macroblock-by-macroblock basis, slice-by-slice basis, picture-by-picture basis, or on some other basis. The multiple available scan orders can include one or more pre-defined scan orders that are set at both the encoding tool and a corresponding decoding tool. When one of the pre-defined scan orders is used, the encoding tool (400) signals the scan order selection using a code or other bitstream element that identifies the selected scan order. The multiple available scan orders can also include one or more scan orders that are specially defined by the encoding tool (400) during encoding and signaled to the corresponding decoding tool for use in decoding. After signaling the scan order itself, when the encoding tool (400) later uses the scan order, the tool (400) can signal a code or other bitstream element identifying the scan order, which the decoder has stored.

While the zigzag scan order (200) provides suitable clustering of non-zero values for some blocks of transform coefficients, by selectively using other scan orders the encoding tool (400) can often improve entropy coding efficiency. The tool (400) can select a scan order using an open loop approach or closed loop approach. The buffer (440) stores the entropy encoded coefficient values (435), and the buffer fullness thus provides some measure of the efficiency of the compression provided by the entropy encoding. This measure may be based on total size of the compressed coefficients or some other measure. The coefficient scanner (425) can apply different scan orders, with the tool (400) evaluating results. In a closed loop approach, the tool (400) applies every scan order available and selects the one that results in the most efficiently compressed entropy encoded coefficient values (435). In some implementations, if none of the pre-defined scan orders provides acceptable performance (e.g., according to a threshold that may be pre-programmed or user-defined), the tool (400) determines a new scan order and signals it in the output bitstream. Alternatively, the scan order may be dictated by a user.

Figure 5A:
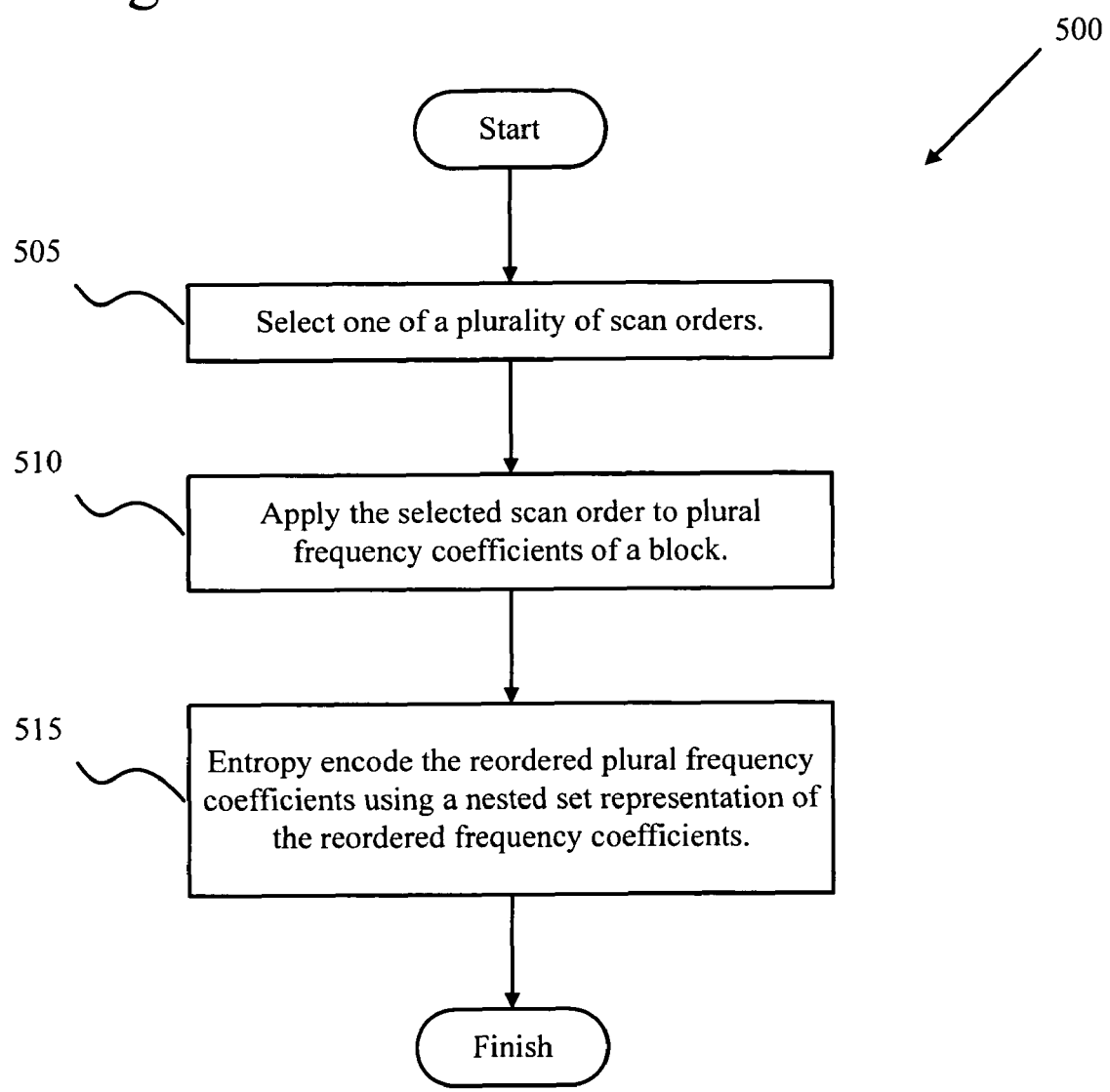

III. General Encoding Techniques for a Nested Set Representation of Reordered Frequency Coefficients FIG. 5A shows a flow chart of one generalized technique (500) of encoding a block of frequency coefficients. An encoding tool such as a tool (400) described with reference to FIG. 4, or other tool, performs the technique (500). The technique (500) shown in FIG. 5A includes adaptive selection of scan order and entropy encoding using a default multi-level nested set representation.

The tool selects (505) one of a plurality of scan orders. The scan order may be selected (505) according to efficiency of compression according to actual results or the estimated efficiency of compression. Additionally, the scan order may be one of a plurality of pre-determined scan orders, or the scan order may be constructed by the tool (400) during the encoding process.

The tool then applies (510) the selected scan order to the plural frequency coefficients of the block. This step re-orders the plural frequency coefficients into a one-dimensional string of coefficients. Preferably, reordering according to the scan order results in clustering of the non-zero frequency coefficient values within the one-dimensional string of coefficients, for example, at the beginning of the one-dimensional string.

Figure 11A:
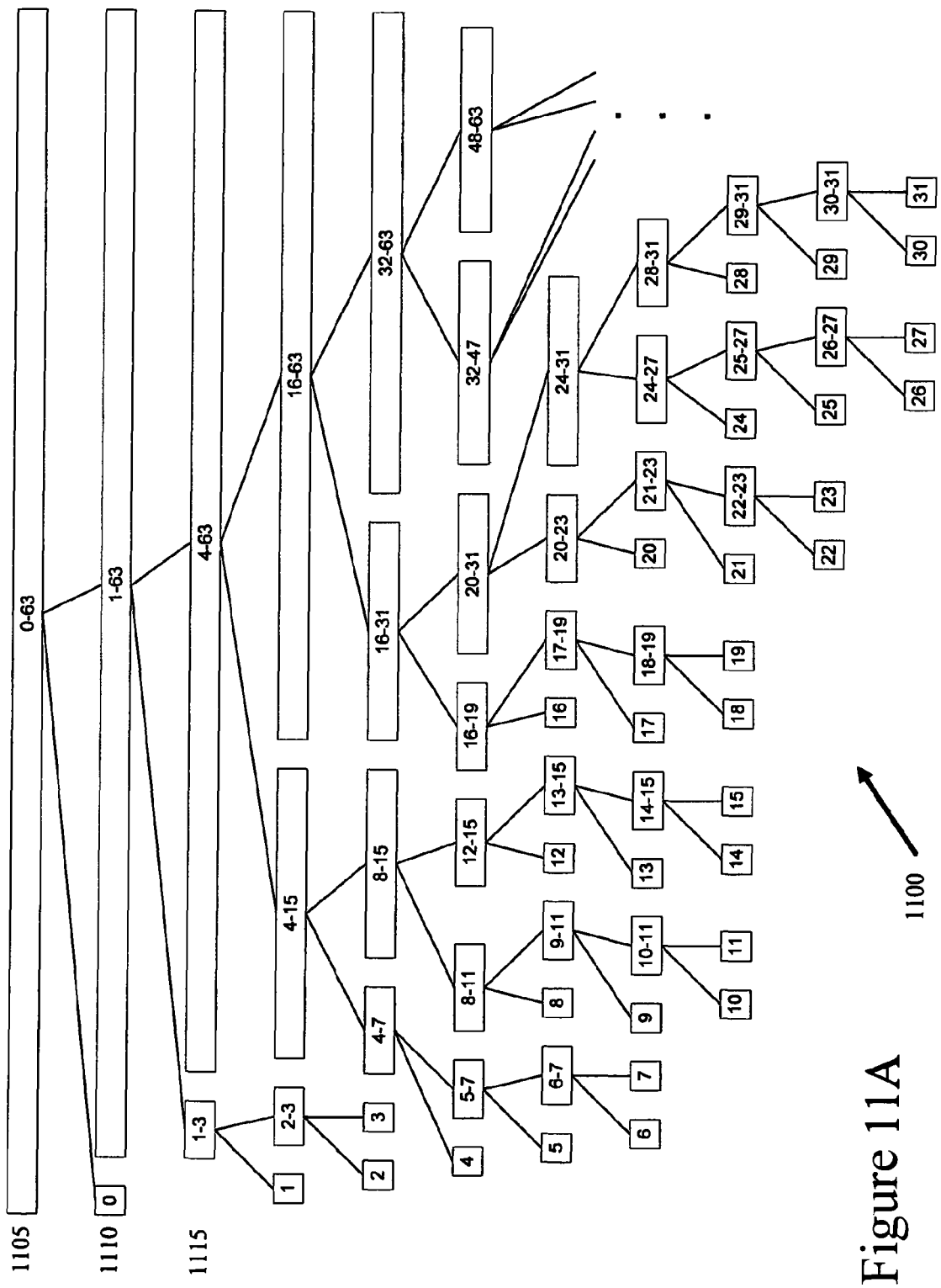
FIGS. 11A, 11B, and 11C are diagrams of example multi-level nested set representations.
Figure 11B:
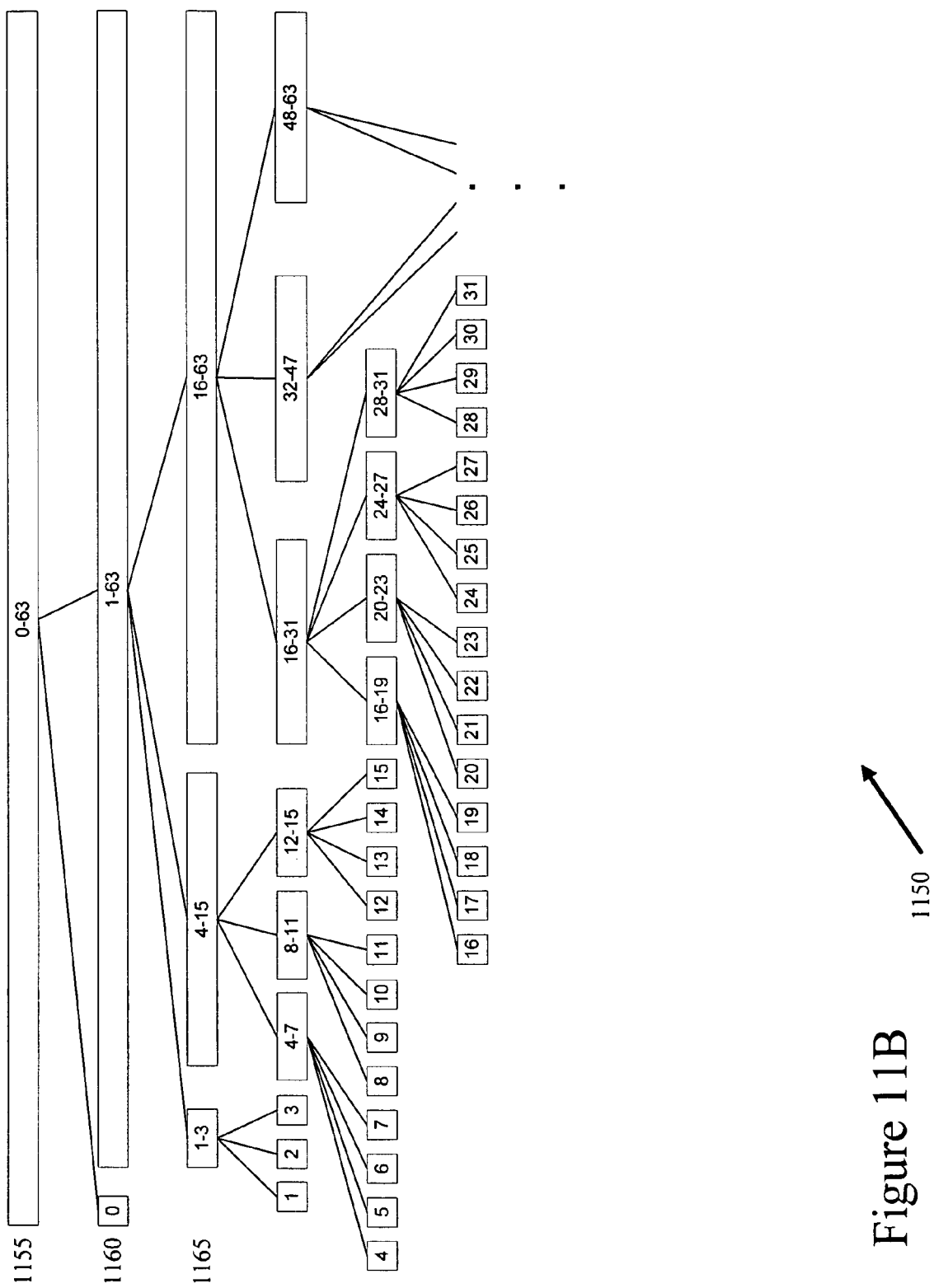
Figure 11C:
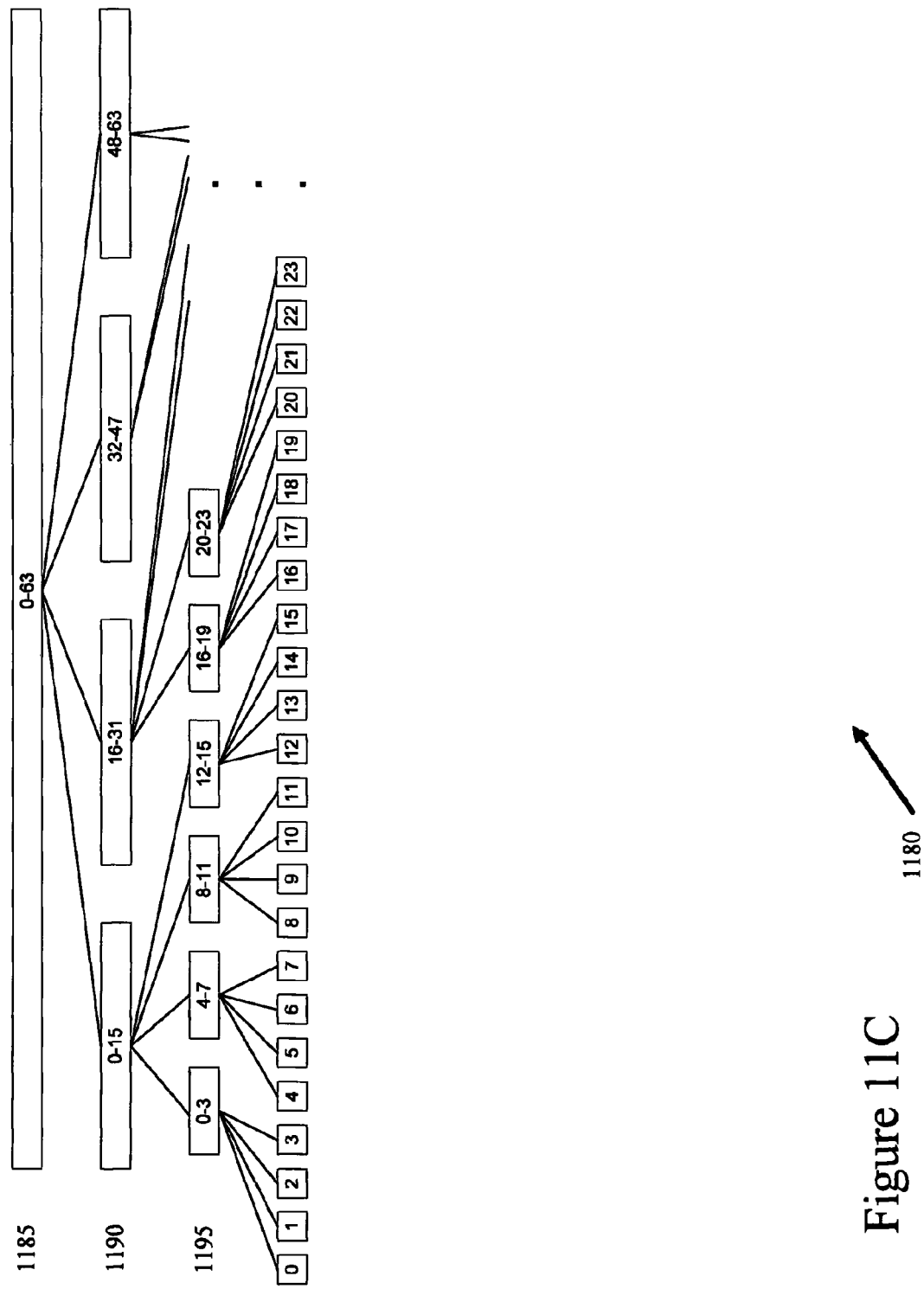

Finally, the tool entropy encodes (515) the reordered frequency coefficients using a default multi-level nested set representation of the reordered frequency coefficients. FIGS. 11A, 11B and 11C show example multi-level nested set representations. The frequency coefficients may be encoded within the nested set representation using entropy encoding methods such as adaptive Huffman coding, run-length coding, or some other method.

The tool repeats the technique (500) on a block-by-block basis or some other basis. For example, the tool selects a scan order on a frame-by-frame basis, selecting a scan order for an entire frame and then reordering coefficients of blocks in the frame prior to entropy encoding.

FIG. 5B shows a flow chart of an alternative generalized technique (520) of encoding the block of plural frequency coefficients. An encoding tool such as a tool (400) described with reference to FIG. 4, or other tool, performs the technique (520). Compared to the technique (500) of FIG. 5A, the technique (520) shown in FIG. 5B includes reordering using a default scan pattern and adaptive selection between different multi-level nested set representations. In this technique (520), the scan order is already determined either by the tool performing prior analysis, by user-definition, or by some other determining factor. The tool applies (525) the scan order to the frequency coefficients of the block. This re-orders the plural frequency coefficients into a one-dimensional string of coefficients.

The tool then selects (530) one of a plurality of multi-level nested set representations. The nested set representations can be selected based upon efficiency of encoding, user-definition, or some other factor. FIG. 11A shows one example multi-level nested set representation for 64 transform coefficients in a one-dimensional vector, according to which each set is split into two subsets, each subset including one or more transform coefficients. FIG. 11B shows an alternative multi-level nested set representation, according to which each set is split into two, three, or four subsets, each subset including one or more transform coefficients. FIG. 11C shows a third multi-level nested set representation with three layers—at a layer, each set (or subset) is split into four subsets (or transform coefficients). Other nested set representations partition the 64 coefficients in different ways, for example, splitting a top layer 0 to 64 into a first set for positions 0 to 3 and a second set for positions 4 to 63, splitting the second set into first and second subsets, and so on. Specific patterns of clustering of frequency coefficients may be predicted for certain scan orders or types of pictures, and a particular nested set representation may be specified to take advantage of the patterns and further increase encoding efficiency. Particular types of entropy encoding may work better with particular nested set representations that more aggressively split sets of coefficients into more subsets. The tool then entropy encodes (535) the reordered plural frequency coefficients according to a method such as adaptive Huffman encoding, run-length encoding, or some other entropy encoding method, using the selected nested set representation.

The tool repeats the technique (520) on a block-by-block basis or some other basis. For example, the tool selects a multi-level nested set representation on a frame-by-frame basis, selecting a nested set representation for an entire frame and then reordering coefficients of blocks in the frame prior to entropy encoding using the selected nested set representation.

FIG. 5C shows a flow chart of an alternative generalized technique (540) of encoding the block of frequency coefficients. An encoding tool such as a tool (400) described with reference to FIG. 4, or other tool, performs the technique (540). This technique (540) generally combines the techniques (500, 520) described with reference to FIGS. 5A and 5B.

In this technique (540), the tool selects (545) one of a plurality of scan orders and then applies (550) the selected scan order to the plural frequency coefficients of the block. Next, the tool selects (555) one of a plurality of nested set partitions and entropy encodes (560) the reordered plural frequency coefficients according to an entropy encoding method such as run-length encoding, adaptive Huffman encoding, or some other method, using the selected nested set partition. The tool repeats the technique (540) on a block-by-block basis or some other basis. For example, the tool selects a scan order and a multi-level nested set representation on a frame-by-frame basis, selecting the scan order and nested set representation for an entire frame, then reordering coefficients of blocks in the frame using the selected scan order prior to entropy encoding using the selected nested set representation.

Figure 6:
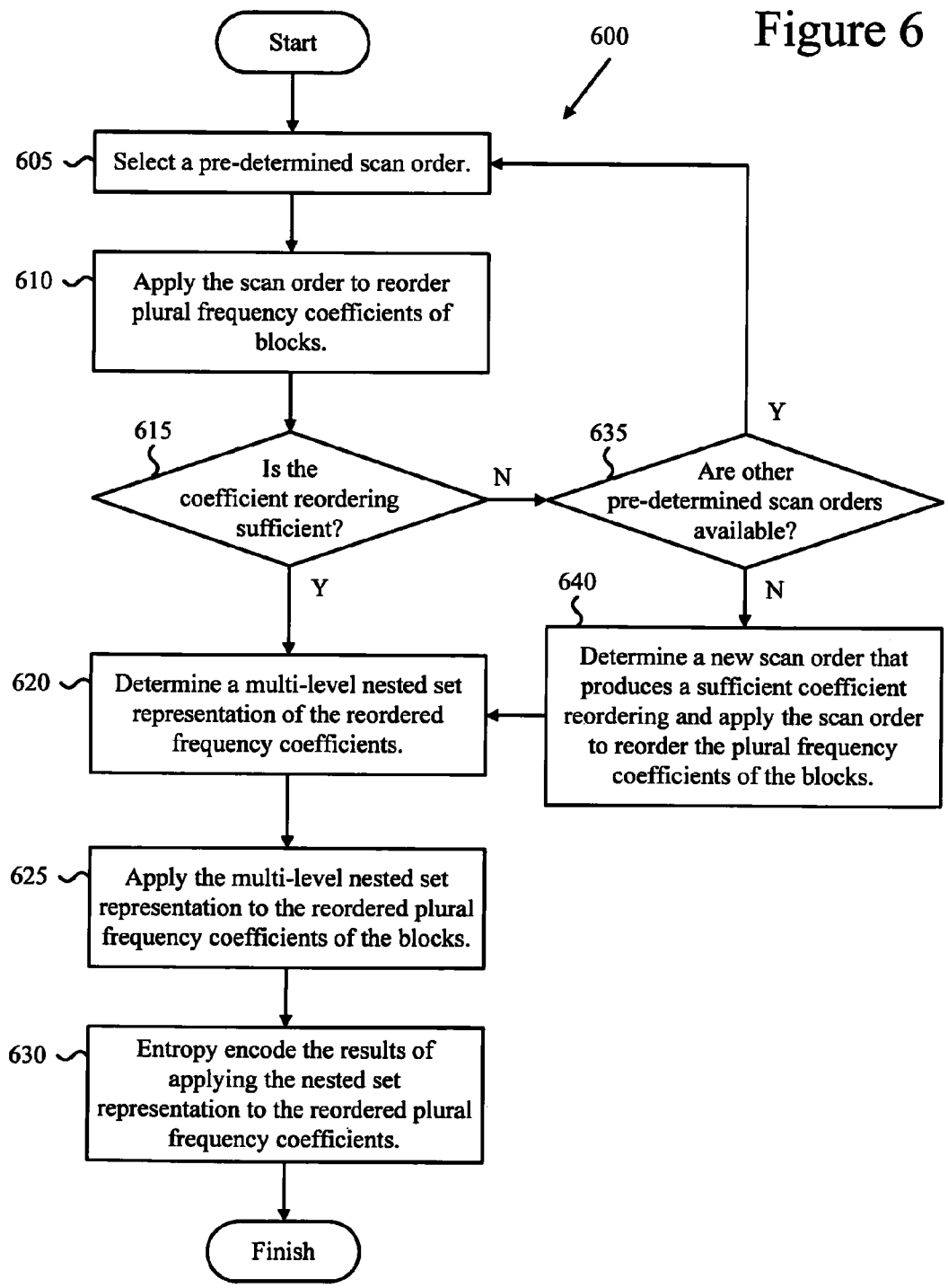
FIG. 6 is a flowchart illustrating an exemplary technique of selecting a scan order and encoding a picture using a multi-level nested set representation.

IV. Exemplary Encoding Techniques for a Nested Set Representation of Reordered Frequency Coefficients FIG. 6 shows a flow chart of an exemplary technique (600) of encoding blocks of frequency coefficients for a picture. An encoding tool such as a tool (400) described with reference to FIG. 4, or some other encoding tool, performs the technique (600).

In this technique (600), the tool selects (605) a pre-determined scan order for evaluation. Generally, the tool can use any of multiple pre-determined scan orders. In certain implementations, a default scan order exists and is the first scan order chosen. The default scan order may be defined in the source code for the encoding tool, or as an encoding tool setting, or a user may define the default scan order for a specific picture or sequence when initiating the encoding. Alternatively, a default scan order does not exist and instead one of the multiple pre-determined scan orders is chosen at random.

The tool applies (610) the selected pre-determined scan order to reorder the frequency coefficients of the blocks. For a given block, applying the pre-determined scan order generally comprises traversing the two-dimensional block of frequency coefficients according to the scan order, and re-ordering the coefficients into a one-dimensional string of frequency coefficients.

After the tool has applied (610) the scan order to the frequency coefficients of the blocks, respectively, the tool checks (615) whether the coefficient reordering is sufficient. For example, this check (615) comprises determining if the application (610) of the scan order to the plural frequency coefficients of the blocks clusters the non-zero frequency values of the two-dimensional blocks to the front of the one-dimensional strings of coefficients sufficiently. This check (615) can be based upon a pre-determined threshold for the tool, a user-selected threshold, or some other determination.

The scan order determination is performed when a frame is encoded such that all of the blocks in the frame are encoded using the same selected scan order. Alternatively, the scan order determination can be performed at the beginning of a sequence such that a sequence of pictures is all encoded with the same general scan order, or the scan order can be determined on a block-by-block basis or on some other basis. When scan order selection occurs can be selected according to a user-defined criteria or according to other criteria such as a directive encoded in the source code of the encoding tool.

If the coefficients are reordered sufficiently, the tool next determines (620) a multi-level nested set representation of the reordered frequency coefficients for the blocks of the picture. In certain implementations, there is only one nested set representation available for the tool. The nested set representation is pre-defined in the source code for the encoding tool, as an encoding tool setting, by a user directive, or by some other criteria. Alternatively, the tool has a plurality of nested set representations to choose from. Generally, the nested set representations may be defined or selected based upon factors such as the type of entropy encoding used, whether the plural frequency coefficients are generally arranged in a consistent pattern, or which nested set representation produces the most efficient encoding of the one-dimensional string of frequency coefficients for the picture.

The tool applies (625) the chosen multi-level nested set representation to the reordered frequency coefficients to produce a series of symbols for each of the blocks of the picture, and entropy encodes (630) the symbols. Generally, for a given layer of the multi-level nested set representation, the encoding tool represents results using symbols that summarize the coefficient values in sets (or subsets) at the layer. For example, each symbol indicates the presence or absence of non-zero frequency coefficient values in a given set (or subset) of the frequency coefficient values. If a symbol for a given set (or subset) indicates the presence of at least one non-zero frequency coefficient value in the given set (or subset) of the frequency coefficient values, another symbol may indicate the presence or absence of non-zero frequency coefficient values in a lower layer subset of the given set (or subset) of the frequency coefficient values. This recursive nesting of sets and subsets may be repeated until the subset contains only zero values or only one non-zero coefficient, in which case another symbol would indicate the non-zero value of the specific frequency coefficient at that position In some implementations, the tool applies adaptive Huffman coding to the reordered frequency coefficients. Alternatively, the tool can use other entropy encoding methods such as non-adaptive Huffman coding, run-length coding, arithmetic coding, LZ coding, or some other method.

Returning to a previous step, if the coefficient reordering (615) is not sufficient for a reason such as the reordering not satisfying a certain efficiency threshold, or some other reason, the tool checks whether other pre-determined scan orders are available (635). If one or more different pre-determined scan orders are available, the tool repeats the process of selecting (605) one of the one or more pre-determined scan orders, applying (610) the selected scan order to reorder the frequency coefficients of the blocks according to the selected scan order, and checking (615) whether the coefficient reordering is sufficient.

If the tool checks (635) and another pre-determined scan order is not available, then the tool determines (640) a new scan order that produces sufficient coefficient reordering and applies that scan order to reorder the frequency coefficients of the blocks. Another pre-determined scan order may be unavailable for reasons such as a user specifying not to use a particular scan order, only one scan order being pre-determined for the tool, or all of the scan orders having been traversed and none of them have reordered the coefficients sufficiently. Alternatively, if another pre-determined scan order is not available, the tool simply uses the pre-determined scan order that produced the most efficient coefficient reordering, or the tool may signal an error to a user.

V. Example Scan Orders and Signaling of Scan Order Selections

FIG. 2 illustrates one possible scan order (200) which an encoding tool (400), such as that shown in FIG. 4, may apply to reorder frequency coefficients. Using a fixed zigzag scan order may be inefficient for some blocks of transform coefficients, however. FIGS. 7 and 8 show two alternative scan orders. Alternatively, an encoding tool and decoding tool use other and/or additional scan orders.

FIG. 7 illustrates one alternative scan order (700) which an encoding tool (400), such as that shown in FIG. 4, may apply to reorder frequency coefficients. The scan order (700) that is shown in FIG. 7 could be used for a general distribution of frequency coefficients. In certain implementations, this scan order (700) is the default scan order for a block.

FIG. 7 also shows the result of applying the scan order (700) to the frequency coefficients (100) that are shown in FIG. 1 to produce an exemplary one-dimensional string (750). The coefficient value 25 is at coefficient position 0 of the scan order (700), so the first value of the one-dimensional string (750) is 25. Continuing along the scan order (700), the next coefficient value scanned would be at coefficient position 1 in the scan order which corresponds to the value 12 in the frequency coefficients (100), so the coefficient value 12 is next in the one-dimensional string (750). This is followed by the coefficient value 0 at coefficient position 2, then the value −5 at position 3. Coefficient positions 4 through 28 have coefficient values of 0, leading to 25 0 values in the one-dimensional string (750), and so on. The one-dimensional string (750) produced by the scan order (700) is slightly more efficient (in terms of clustering of non-zero values) than the one-dimensional string (250) produced by reordering according to the prior art zigzag pattern (200) of FIG. 2.

FIG. 8 illustrates a more efficient scan order (800) for the particular frequency coefficients (100) shown in FIG. 1. This scan order (800) may be defined by a particular user. Alternatively, this scan order (800) may be one of a plurality of possible pre-defined scan orders available to the encoding tool and be chosen as the scan order that most efficiently re-orders the plural frequency coefficients. Or, the scan order (800) is not one of the pre-determined scan orders but instead is determined by the encoding tool if none of the pre-determined scan orders re-order the frequency coefficients (100) appropriately.

FIG. 8 shows the result of applying the scan order (800) to the frequency coefficients (100) that are shown in FIG. 1 to produce an exemplary one-dimensional string (850). Compared to the results of applying the scan order (700) of FIG. 7 or applying the scan order (200) of FIG. 2, the one-dimensional string (850) is significantly more compact for this particular scan order (800).

FIGS. 9A and 9B illustrate one approach to signaling and receiving selection information when an encoding tool and decoding tool select among multiple scan order options on a frame-by-frame basis. This approach uses a combination of sequence-layer syntax elements and picture-layer syntax elements.

FIG. 9A shows a pseudocode listing (900) for a decoding tool that receives sequence-layer syntax elements indicating scan orders defined by an encoding tool for a sequence. An encoding tool performs corresponding signaling of the information. In a sequence header, the decoding tool receives and parses a syntax element NumOfNonDefaultScanOrders that indicates how many scan orders (from 0 to 15) will follow in the sequence header.

For each of the defined non-default scan orders, the decoding tool receives information indicating the index positions for the scan order. FIG. 9A shows signaling for 8×8 blocks. For each of the 64 positions in a scan order for an 8×8 block, the decoding tool receives a single bit DefaultIdx indicating whether the position has the default value for scan order position. The following listing (available to both the decoding tool and the encoding tool) indicates the default positions for scan orders. DefaultScanOrderIdx[64]={0, 1, 4, 5, 16, 17, 20, 21, 2, 3, 6, 7, 18, 19, 22, 23, 8, 10, 12, 13, 24, 25, 28, 29, 9, 11, 14, 15, 26, 27, 30, 31, 32, 34, 40, 41, 48, 49, 52, 53, 33, 35, 42, 43, 50, 51, 54, 55, 36, 38, 44, 45, 56, 57, 60, 61, 37, 39, 46, 47, 58, 59, 62, 63}. The default positions correspond to the positions shown in FIG. 7. If DefaultIdx indicates the default position is used in the signaled scan order, the decoding tool looks up the default position in DefaultScanOrderIdx. Otherwise, the decoding tool gets six bits indicating the non-default position used in the signaled scan order.

The decoding tool stores the signaled pre-defined scan orders for the sequence in addition to zero or more other scan orders that are always available to the encoding tool and decoding tool. Although FIG. 9A shows signaling for 8×8 blocks, for other size blocks, the encoding tool can signal a block size per scan order.

FIG. 9B shows a pseudocode listing (910) for a decoding tool that switches between scan orders. The decoding tool switches scan orders, for example, on a frame-by-frame basis during decoding. An encoding tool performs corresponding signaling of the scan order selection information, for example, in a frame header signaling the scan order to use for a frame.

The decoding tool receives and parses a syntax element UseDefaultOrder that indicates whether to use a default scan order for the frame (with no further signaling of scan order information for the frame) or a non-default scan order for the frame. The default scan order can be defined by the encoding tool and decoding tool for all sequences, for the particular sequence being encoded/decoded, or derived by set rules at the encoding tool and decoding tool.

If the decoding tool uses a non-default scan order for the frame, the decoding tool checks whether one of the non-default scan orders (if any) that were signaled for the sequence should be used. If so, the decoding tool receives and parses a syntax element OrderIdx that identifes one of the non-default scan orders that were signaled for the sequence.

Otherwise (if no non-default scan orders were signaled for the sequence, or they were signaled but should not be used), the decoding tool receives and parses information for a new scan order. Like FIG. 9A, FIG. 9B shows signaling for 8×8 blocks. For each of the 64 positions in the new scan order for an 8×8 block, the decoding tool receives a single bit DefaultIdx indicating whether the position has the default value for scan order position. If not, the decoding tool gets six bits indicating the non-default position used in the new scan order.

Alternatively, an encoding tool and decoding tool use another bitstream syntax to switch scan orders on a macroblock-by-macroblock basis, frame-by-frame basis, or some other basis.

VI. Example Encoding Using a Multi-Level Nested Set Representation

Figure 10:
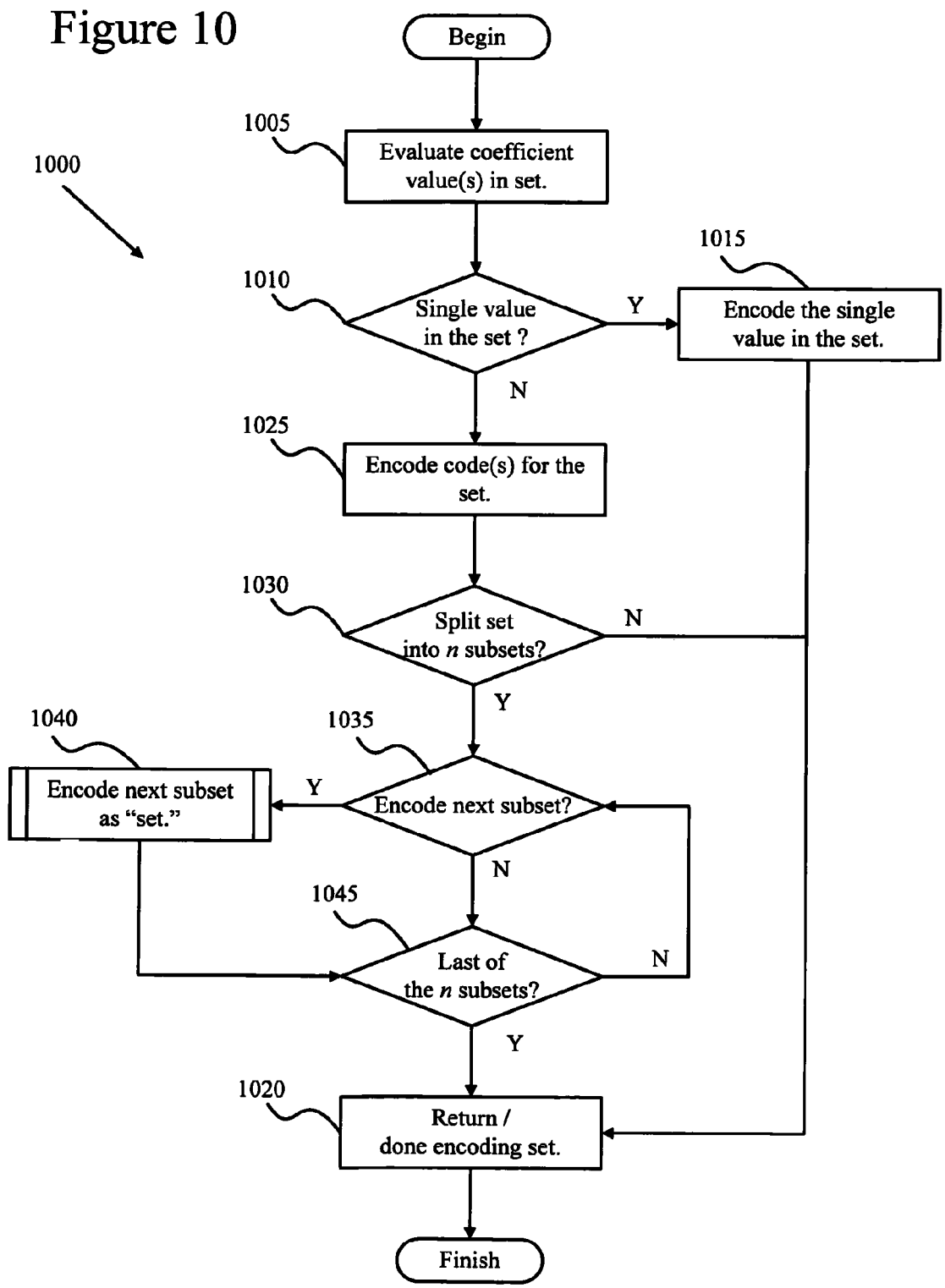
FIG. 10 is a flowchart illustrating an exemplary technique of encoding a set of frequency coefficient values for a block using a multi-level nested set representation.

FIG. 10 shows an exemplary technique (1000) of encoding a re-ordered block of plural frequency coefficients using a multi-level nested set representation. The technique (1000) could be used, for example, in the technique (600) described in FIG. 6. The technique (1000) is recursive. When encoding a set of coefficient values, the technique (1000) in some cases recursively encodes a subset of coefficient values, or each of multiple subsets, within the set. The technique (1000) includes an exit condition, upon which the technique (1000) returns to the point of entry or is done encoding the set.

In this technique (1000), the encoding tool receives a set of coefficient values in a one-dimensional string produced by reordering the frequency coefficient values of a block according to a particular scan order. The tool evaluates (1005) the one or more coefficient values at the given level of the set. When this technique (1000) is first initiated, the set of plural frequency coefficients will generally include all of the plural frequency coefficients in the one-dimensional string. Later, the technique (1000) may be performed on a smaller set that is subset of the one-dimensional string. For this reason, the set in question may comprise 64 coefficient values, 63 coefficient values, 32 coefficient values, 16 coefficient values, 1 coefficient value, or some other number of coefficient values.

The encoding tool checks (1010) whether the given set of coefficients contains only a single frequency coefficient. If the set of frequency coefficients does contain only a single coefficient, then the tool encodes (1015) the value of the coefficient. For example, the tool uses Golomb coding, Huffman coding, or another form of variable length coding for the single coefficient value. If the amplitude of the value of the single coefficient is implied elsewhere (e.g., when the coefficient is −1 or 1 for some types of entropy coding), the tool signals a flag indicating the sign of the single coefficient. The tool then returns (1020) to the point of entry (for a subset) or is done encoding that particular set of frequency coefficients.

If the given set contains multiple frequency coefficients in the set, then the tool analyzes the set and encodes (1025) one or more codes for the set. Depending on the type of entropy encoding used, the code(s) indicate the presence or absence of non-zero frequency coefficients in the set and can also indicate which subsets within the set include any non-zero value frequency coefficients. If the set does not include any non-zero frequency coefficients, then the tool encodes a symbol indicating that the set does not include any non-zero frequency coefficients. If, however, the set includes at least one non-zero frequency coefficient, then the tool encodes one or more symbols indicating the presence of one or more non-zero frequency coefficients in the set. The code(s) also indicate that the given set should be split into n subsets and give information about the presence or absence of non-zero frequency coefficient values in each of the n subsets. For example, the code or codes could indicate that a first subset does not include at least one frequency coefficient with a non-zero value, that a second subset does include at least one frequency coefficient with a non-zero value, and that a third subset does not. For some multi-level nested set representations, n is equal to 2 and each set can be split into up to two subsets. Alternatively, n is some other number such as 3 or 4. In certain embodiments, the code(s) may additionally indicate other information about the non-zero value(s) of the frequency coefficients in the set, such as whether a single coefficient in a subset is positive or negative, or whether any coefficient in a subset is greater than or equal to a given value.

After the tool has encoded (1025) the one or more codes for the set, the tool determines whether to split (1030) the given set into up to n subsets of frequency coefficients. If there are no non-zero frequency coefficients in the set, then the tool does not split the set and returns (1020) to the point of entry (for a subset) or is done encoding that particular set of frequency coefficients.

If, however, the set contains one or more non-zero frequency coefficients, then the tool encodes any subset that includes at least one non-zero value. The tool splits (1030) the given set into up to n subsets and checks (1035) to see whether to encode the first of the subsets as a "set." If the first of the subsets contains a non-zero frequency coefficient, then the tool performs the method (1000) on the first subset at a lower level and thereby encodes (1040) the first subset as a "set." When the subset is encoded (1040), the symbols and codes produced by the tool performing the method (1000) are organized to make clear that the frequency coefficient values being analyzed are a subset of the first set, and are being analyzed at a lower level of representation in the nested set representation.

If the first subset should not be encoded because it does not contain at least one non-zero frequency coefficient, the tool then checks (1045) if other subsets remain in the set. Similarly, after the tool has encoded (1040) the first subset, the tool checks (1045) if other subsets remain in the set. If another subset exists, then the tool checks (1035) to see whether to encode the subset as a "set" and, if so, the tool encodes (1040) the subset. After the tool has determined that no other subsets remain for a set, the tool returns (1020) to the point of entry (for a subset) or is done encoding that particular set of frequency coefficients—the tool either returns to a higher level to encode a next set or subset, or moves to another block or picture.

VII. Example Multi-Level Nested Set Representations

Using a multi-level nested set representation for transform coefficients can facilitate efficient entropy encoding of the transform coefficients by using a summary representation of zero-value transform coefficients. Multi-level nested set representations are particularly effective when used in combination with adaptive scan order selection, but they can also be used with non-adaptive scan reordering. Depending on implementation, a multi-level nested set representation for a block can be encoded using Huffman coding, run-level coding, another variation of run-length coding, or some other form of entropy coding.

Consider a typical 8×8 block of transform coefficients (after quantization). Most of the non-zero coefficient values are clustered in a few areas, such as the top left corner for low frequency coefficients. An effective multi-level nested set representation groups zero-value high-frequency coefficients together as a single block and represents them as a single zero-value coefficient (or symbol). Aside from grouping zero-value coefficients into a block or blocks in this way, the multi-level nested set representation groups a subset of coefficients that include non-zero values (or a mix of non-zero values and zero values) as a single block and treats them as one coefficient (or symbol). At a given level, the multi-level nested set representation includes one or more "summary" coefficients (or symbols), which are then entropy encoded. For a block that includes one or more non-zero value coefficients, the multi-level nested set representation recursively splits the coefficients into sub-groups that are represented as single coefficients (or symbols) for encoding.

FIGS. 11A, 11B, and 11C illustrate example multi-level nested set representations. FIGS. 11A, 11B and 11C illustrate example multi-level nested set representations (1100, 1150, 1180) for a block with 64 coefficients which could be used, for example, in the technique (1000) shown in FIG. 10. Alternatively, an encoding tool and decoding tool use other and/or additional multi-level nested set representations.

With reference to FIG. 11A, when a set is split into n subsets, n is equal to 2. In the representation (1150) shown in FIG. 11B, n is equal to 2, 3 or 4, and in the representation (1180) shown in FIG. 11C, n is equal to 4. Alternatively, n could be equal to 3, 4, or some other number.

In this representation, the coefficient values at positions 0 through 63 represent a first set at a first level (1105) and are potentially split into a first subset at a second level (1110) containing the coefficient value at position 0 and a second subset at the second level (1110) containing the coefficient values at positions 1 through 63. The set for position 0 is a set with a single coefficient value, and therefore a non-zero value of the frequency coefficient at position 0 would be entropy encoded, for example, using a code at the second level (1110).

If the subset (for positions 1 to 63) at the second level (1110) includes any non-zero coefficient values, the coefficient values at positions 1 through 63 are split into two subsets at a third level (1115). The first of the subsets at the third level (1115) contains the coefficient values at positions 1 through 3, and the second of the subsets at the third level (1115) contains the coefficient values at positions 4 through 63. Subsets that include only zero-value coefficients are not further split. If one of the subsets at the third level (1115) includes a non-zero coefficient value, however, the subset at the third level (1115) is split into a plurality of different subsets at a fourth level, and so on, as shown in FIG. 11A.

FIG. 11B shows a second multi-level nested set representation (1150) according to which the set (for positions 0 to 63) at the first level (1155) is potentially split into two subsets at a second level (1160), and the second subset (for positions 1 to 63) at the second level (1160) is potentially split into three subsets at a third level (1165). The representation (1150) in FIG. 11B is broader than the representation (1100) in FIG. 11A but not as deep, since sets (or subsets) are potentially split into three or four subsets at a lower level.

FIG. 11C shows a third multi-level nested set representation (1180) according to which the set (for positions 0 to 63) at the first level (1185) is potentially split into four equal-size subsets at a second level (1190), and each of the subset at the second level (1190) is potentially split into four subsets at a third level (1195). The representation (1180) in FIG. 11C is even broader than the representation (1150) in FIG. 11B, since sets (or subsets) are potentially split into four subsets at each lower level.

Figure 12A:
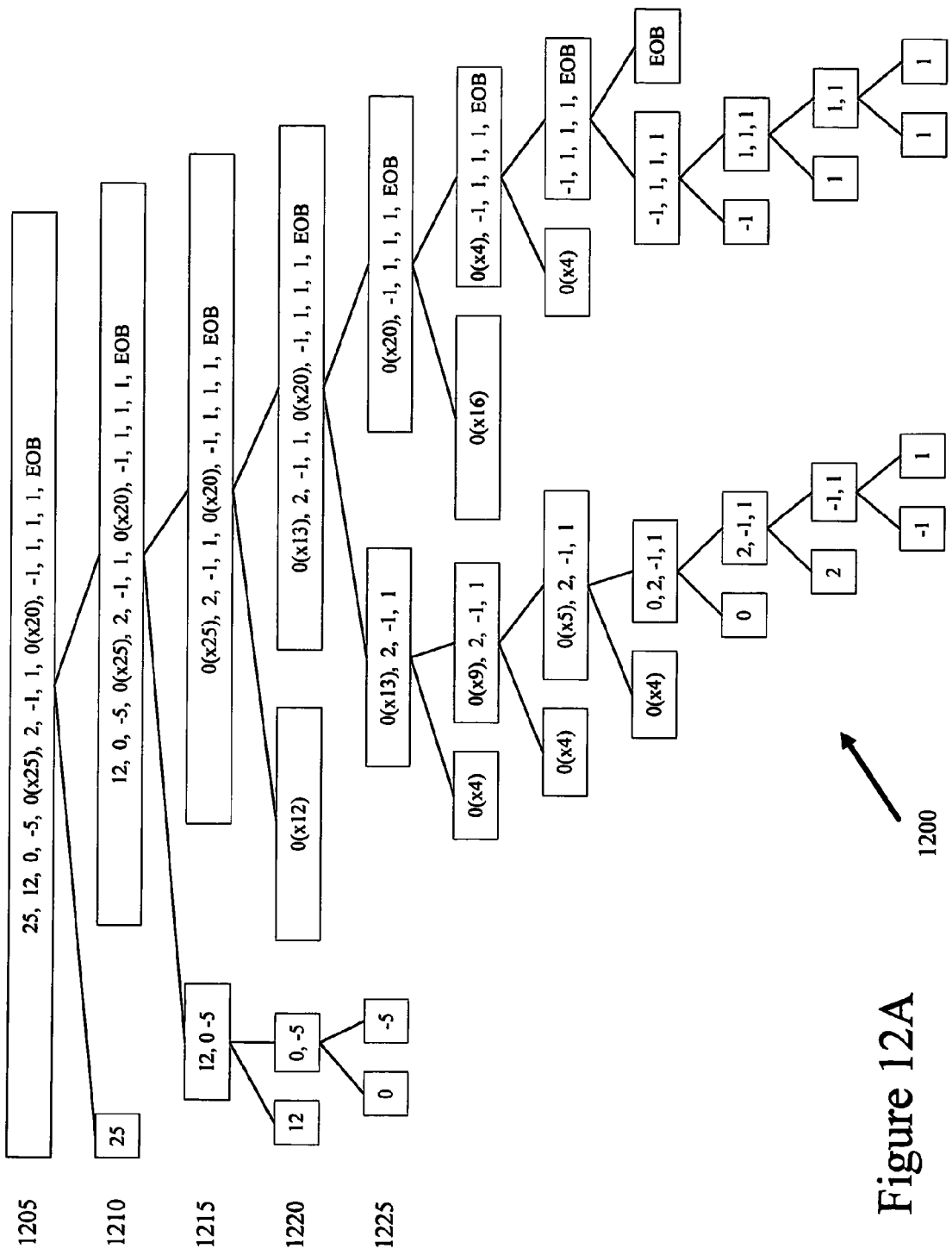
FIG. 12A is a diagram illustrating the application of the multi-level nested set representation of FIG. 11A to the vector of reordered coefficient values shown in FIG. 7.

FIG. 12A illustrates application of the multi-level nested set representation (1100) of FIG. 11A to the exemplary one-dimensional string (750) of FIG. 7. The one-dimensional string (750) for the transform coefficients (100) provides the first level set (1205) comprising values for coefficients from position 0 through position 63. The first level set (1205) is not a single valued set and includes at least one non-zero values, so the first level set is split into multiple subsets. Depending on how entropy coding is implemented, one or more codes indicate that the first level set is split into two subsets at a second level (1210). In the present example, the two subsets at the second level (1210) comprise a first subset for the coefficient at position 0, and a second subset for the coefficients at positions 1 through 63.

The tool then encodes the first subset (for position 0) at the second level (1210) as a "set." In the present example, the subset contains only a single value, the coefficient value 25 at coefficient position 0. The tool entropy encodes this first subset.

The tool then proceeds to encode the second subset at the second level (1210) (comprising values for the coefficients at positions 1 through 63) as a set. The second subset is split into two subsets at a third level (1215). The first of the third-level subsets comprises the coefficients values 12, 0, and −5, which are the coefficient values at coefficient positions 1, 2, and 3, respectively. The second third-level subset comprises the coefficient values at coefficient positions 4 through 63.

The first subset at the third level (1215) is split into two subsets at a fourth level (1220). The first of these fourth-level subsets comprises the coefficient value 12, which is the coefficient value at the coefficient position 1. This coefficient value is entropy encoded. The other of these fourth-level subsets comprises the values 0 and −5, which are the coefficient values at coefficient positions 2 and 3. This fourth-level subset is split into two subsets at a fifth level (1225). The first of these fifth-level subsets comprises a single coefficient value of 0 at coefficient position 2, and the second of these fifth-level subsets comprises a single coefficient value of −5 at coefficient position 3. Each of these subsets is a single valued subset, and so the coefficient value of each of the subsets is entropy encoded.

Returning to the third level (1215), the second subset at the third level (1215) (containing the coefficient values at coefficient positions 4 through 63) is split into two subsets at the fourth level (1220). The first of these fourth-level subsets comprises values for the coefficients at positions 4 through 15, and the second of these fourth-level subsets comprises values for the coefficients at positions 16 through 63. In this example, the coefficient values at coefficient positions 4 through 15 are all 0. Because of this, the subset for positions 4 to 15 does not need to be further divided because it does not contain any non-zero coefficient values. A code indicating that the subset does not contain any non-zero frequency coefficient values is signaled, the subset is not split, and no further analysis is performed on this subset. The subset containing the values for coefficients at positions 16 through 63 is split into two separate subsets at the fifth level (1225), each including a mix of zero-value coefficients and non-zero-coefficients. This analysis and selective splitting of sets into subsets is continued until all of the non-zero frequency coefficients have been located and entropy encoded.

Figure 12B:
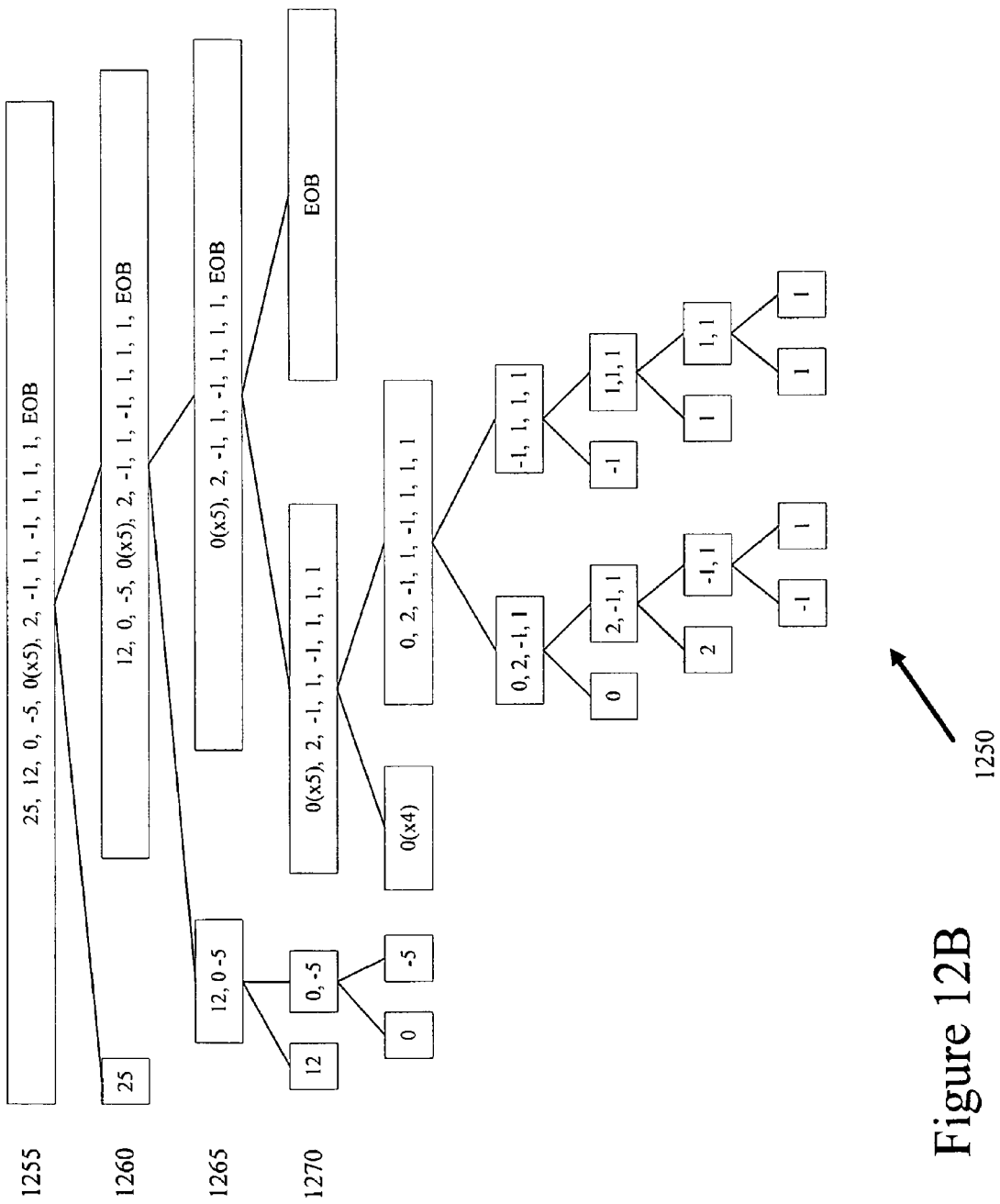
FIG. 12B is a diagram illustrating the application of the multi-level nested set representation of FIG. 11A to the vector of reordered coefficient values shown in FIG. 8.

FIG. 12B illustrates application of the multi-level nested set representation (1100) of FIG. 11A to the exemplary one-dimensional string (850) of FIG. 8. Overall, FIG. 12B shows that the scan order (800) of FIG. 8 clusters the transform coefficients (100) of FIG. 1 more effectively than the scan order (700) of FIG. 7.

The one-dimensional string (850) for the transform coefficients (100) provides the first level set (1255) comprising values for coefficients from position 0 through position 63. The first level set (1255) is split into two subsets, with one or more codes indicating the split into two subsets at a second level (1260). The two subsets at the second level (1210) comprise a first subset for the coefficient at position 0, and a second subset for the coefficients at positions 1 through 63. The subset for position 0 contains a single value, the coefficient value 25 at coefficient position 0, which is entropy coded. The subset for positions 1 through 63 is split into two subsets at a third level (1265).

The first of the third-level subsets comprises the coefficients values 12, 0, and −5, and is handled as described with reference to FIG. 12A. The second third-level subset (for the coefficient values at coefficient positions 4 to 63) is split into two subsets at the fourth level (1270). The first of these fourth-level subsets, comprising values for the coefficients at positions 4 through 15, is further split into two fifth-level subsets. One fifth-level subset contains only zero-value coefficients and is not further split; the other fifth-level subset contains a mix of zero-value coefficients and non-zero-value coefficients and is further split as shown in FIG. 12B. The second of the fourth-level subsets, which comprises zero values for the coefficients at positions 16 through 63, is not further split, and a code indicating that the subset does not contain any non-zero frequency coefficient values is signaled.

Aside from the multi-level nested set representations shown in FIGS. 11A, 11B and 11C, other multi-level nested set representation representations are possible. Instead of splitting each set or subset into two subsets at a next level, each set or subset could be split into up to three subsets, up to four subsets, or some other number of subsets. For example, the first level set comprising the coefficient values at coefficient positions 0 through 63 could be split into three second level subsets, the first comprising the coefficient value at position 0, the second comprising the coefficient values at positions 1 through 15, and the third comprising the coefficient values at positions 16 through 63. Additionally, at least for the representations (1100, 1150) in FIGS. 11A and 11B, the partitioning strategy presumes that the scan order will efficiently group the non-zero frequency coefficient values from the block of transform coefficients towards the front of the one-dimensional string. If, however, the coefficient values were arranged such that they could not be efficiently grouped, the nested set representation could have some other general division such as a dyadic division that splits the first level set comprising the coefficients 0 through 63 into two subsets, the first comprising the coefficient values at coefficient positions 0 through 31, and the second comprising the coefficient values at coefficient positions 32 through 63, with each subset potentially being subjected to further dyadic splitting.

Additionally, the signaling of codes for a multi-level nested set representation depends on implementation. In some cases, the code(s) for a given level are signaled as part of a depth-first traversal of the representation. For FIG. 11A, the encoding tool signals code(s) for 0-63, code(s) for 0, code(s) for 1-63, code(s) for 1-3, code(s) for 1, code(s) for 2-3, code(s) for 2, code(s) for 3, code(s) for 4-63, and so on. Alternatively, codes are signaled as part of a breadth-first traversal of the representation.

VIII. Example Entropy Coding and Decoding

The type of entropy encoding used to represent transform coefficients in a multi-level nested set representation depends on implementation. This section describes two general approaches of entropy encoding and decoding. Alternatively, an encoding tool and decoding tool use another approach.

A. Run-Length Encoding and Decoding Variations

With run-length coding and decoding, symbols (representing individual coefficient values or subsets of coefficient values) for a given set are encoded as a sequence. For example, for a subset, a symbol value of 0 indicates that the subset includes only zero-value coefficients, and a symbol value of 1 indicates that the subset includes at least one non-zero value coefficients. For an individual coefficient value, a symbol value of 0 indicates that the coefficient value is zero, and a symbol value of 1 indicates that the coefficient value is non-zero, with one or more other codes indicating the actual value. In the following examples, each of the terms run_level_code_x, run_length_code_x, and value_x is simply an indicator of a variable length code, fixed length code or other pattern of bits representing a run-level combination, run-length count, or value.

For the multi-level nested set representation (1180) in FIG. 11C, scan order (800) of FIG. 8 and transform coefficients (100) of FIG. 1, positions 0, 1, 3 and 9-15 have non-zero values, and the other positions have zero-value coefficients. The subset for positions 0 to 15 includes at least one non-zero value, but none of the other three second-level subsets includes any non-zero value, so the first level representation is 1 0 0 0. With run-level encoding (each code indicating a run count of zeros+a non-zero level), the symbols are represented as codes for 0 EOB. In practice, this representation is then encoded using some code or codes, which will be indicated herein as run_level_code_0 (for a count of zero 0s+the first 1) and run_level_code_EOB (for the last three 0s). The first level representation 1 0 0 0 suffices to indicate that coefficients at positions 16 through 63 are zero value coefficients.

The subset for positions 0 to 15 is split into four subsets for 0-3, 4-7, 8-11 and 12-15, which are represented with the symbols 1 0 1 1. With the run-level encoding, the symbols are represented as codes for 0 1 0, indicated as run_level_code_0 (for a count of zero 0s+the first 1), run_level_code_1 (for a count of one 0s+the second 1), and run_level_code_0 (for a count of zero 0s+the last 1). This suffices to indicate that coefficients at positions 4 through 7 are zero value coefficients.

The subset for positions 0 to 3 is represented as 1 1 0 1, the subset for positions 8-11 is represented as 0 1 1 1, and the subset for positions 12-15 is represented as 1 1 1 1. These subsets are encoding using the run-level coding, or alternatively using vector Huffman codes or literal values. For each non-zero value, one or more codes then signal the actual value and sign for the coefficient. For example, the codes value_25, value_12 and value_-5 follow the run-level codes for the subset for positions 0-3. The signaling of the codes for a representation can follow a depth-first traversal or breadth-first traversal of the representation.

For the same example multi-level nested set representation from FIGS. 1, 8 and 11C, with a simple run length coding variation expecting alternating runs of zeros and ones (e.g., 0 1 0 or 0 0 0 0 or 1 1 1 0), the symbols 1 0 0 0 are represented as codes for 0 1 EOB, indicated as run_length_code_0 (for a count of zero 0s), run-length-code_1 (for a count of one 1s), and run_length_code_EOB (for a count of three 0s). The subset for positions 0 to 15 is split into four subsets for 0-3, 4-7, 8-11 and 12-15, which are represented with the symbols 1 0 1 1, encoded as run_length_code_0 (for a count of zero 0s), run_length_code_1 (for a count of one 1s), run_length_code_1 (for a count of one 0s), and run_length_code_EOB (for the last two 1s). The subset for positions 0 to 3 is represented as 1 1 0 1, the subset for positions 8-11 is represented as 0 1 1 1, and the subset for positions 12-15 is represented as 1 1 1 1. These subsets are encoded using the variation of simple run length coding, or alternatively using vector Huffman codes or literal values. For each non-zero value, one or more codes then signal the actual value and sign for the coefficient. Again, the signaling of the codes for a representation can follow a depth-first traversal or breadth-first traversal of the representation.

Generally, the pattern of symbols for a set or subset (such as 10, 01 or 11 for two subsets of the set/subset, or 111, 110, 101, 100, 011, 010, or 001 for three subsets of the set/subset) can be indicated with a specific number of bits or pattern of bits in the bit stream, such as run_length_code, run_level_code, or some other pattern. Additionally, the values of the non-zero valued frequency coefficients are indicated with some specific number of bits or pattern of bits. For example, the value 25 can be indicated by an arbitrary code such as value_(25).

B. Huffman Encoding and Decoding

With Huffman coding and decoding, a Huffman code represents the symbol(s) for a particular subset or coefficient. The Huffman codes and symbols represented with the Huffman codes depend on implementation. The Huffman codes can be adaptive or non-adaptive.

For example, for a subset, a symbol value of 0 indicates that the subset includes only zero-value coefficients, and a symbol value of 1 indicates that the subset includes at least one non-zero value coefficients. For an individual coefficient value, a symbol value of 0 indicates that the coefficient value is zero, and a symbol value of 1 indicates that the coefficient value is non-zero, with one or more other codes indicating the actual value. The Huffman code jointly represents the values of the symbols at a given level, for example, representing the four symbol combinations of the previous section.

As another example, the alphabet of symbol values for a symbol has three elements A0, A1 and A2. The first element in the exemplary alphabet is the element A0. This element indicates that for a given set (or subset) of one or more coefficient values (set_cv), each coefficient value (cv) in set_cv is equal to 0. In other words, there are no non-zero frequency coefficient values in set_cv. The second element in the exemplary alphabet is the element A1. This element indicates that for at least one cv in set_cv, cv=1 or −1. Other values cv in set_cv may be equal to 0, as long as one cv is equal to 1 or −1 and none has an absolute value more than 1. The third alphabet element in the exemplary alphabet is A2. This element indicates that for at least one cv in set_cv, cv is greater than 1 or less than −1. Other values cv in set_cv may be equal to 0, 1, or −1, as long as one cv is greater than 1 or less than −1. In alternative embodiments, A2 may signify that at least one cv in set_cv is above or below a different number, for example 2, 4, 8, or some other number.

The three different elements A0, A1, and A2, can assist the tool in determining whether or not to further split the set or subset during encoding, and the elements can assist the tool in reconstructing the values of a set or subset during decoding.

Table 1 indicates exemplary Huffman codes for a set X containing plural frequency coefficient values, at least one of which is equal to 1 or −1 but none of which has an absolute value more than 1. Table 2 indicates exemplary Huffman codes for a set X containing plural frequency coefficient values, at least one of which has a value greater than 1 or less than −1. Each of the Huffman codes indicates information about subsets X__1 and X__2 of the set X, where a subset can include a single coefficient.

TABLE 1

Huffman Codes for Three-code Table

| Huffman code for set (or subset) X | Meaning for subset X__1 of set X | Meaning for subset X__2 of set X |
|---|---|---|
| HC3__0 | A1 | A1 |
| HC3__1 | A1 | A0 |
| HC3__2 | A0 | A1 |

TABLE 2

Huffman Codes for Five-code Table

| Huffman code for set (or subset) X | Meaning for subset X__1 of set X | Meaning for subset X__2 of set X |
|---|---|---|
| HC5__0 | A2 | A2 |
| HC5__1 | A2 | A1 |
| HC5__2 | A2 | A0 |
| HC5__3 | A1 | A2 |
| HC5__4 | A0 | A2 |

For a set or subset X in a multi-level nested set representation, each of the Huffman codes in Table 1 indicates whether A0 or A1 applies for each of the two subsets X__1 and X__2 of X, respectively. Each of the Huffman codes in Table 2 indicates whether A0, A1 or A2 applies for each of the two subsets X__1 and X__2 of X, respectively. For example, if the subset of coefficient values contains 0 and −5, the Huffman code HC5__4 indicates that the first coefficient value is zero and the second coefficient value is non-zero with an absolute value greater than 1. If the subset of coefficient values contains 0, 0, 0, 0, 0, 2, −1, 1 and is split evenly into subsets, the Huffman code HC5__4 indicates the first subset (0, 0, 0, 0) includes only zero-value coefficients and the second subset (0, 2, −1, 1) includes at least one non-zero value coefficient with an absolute value greater than 1.

Figure 13A:
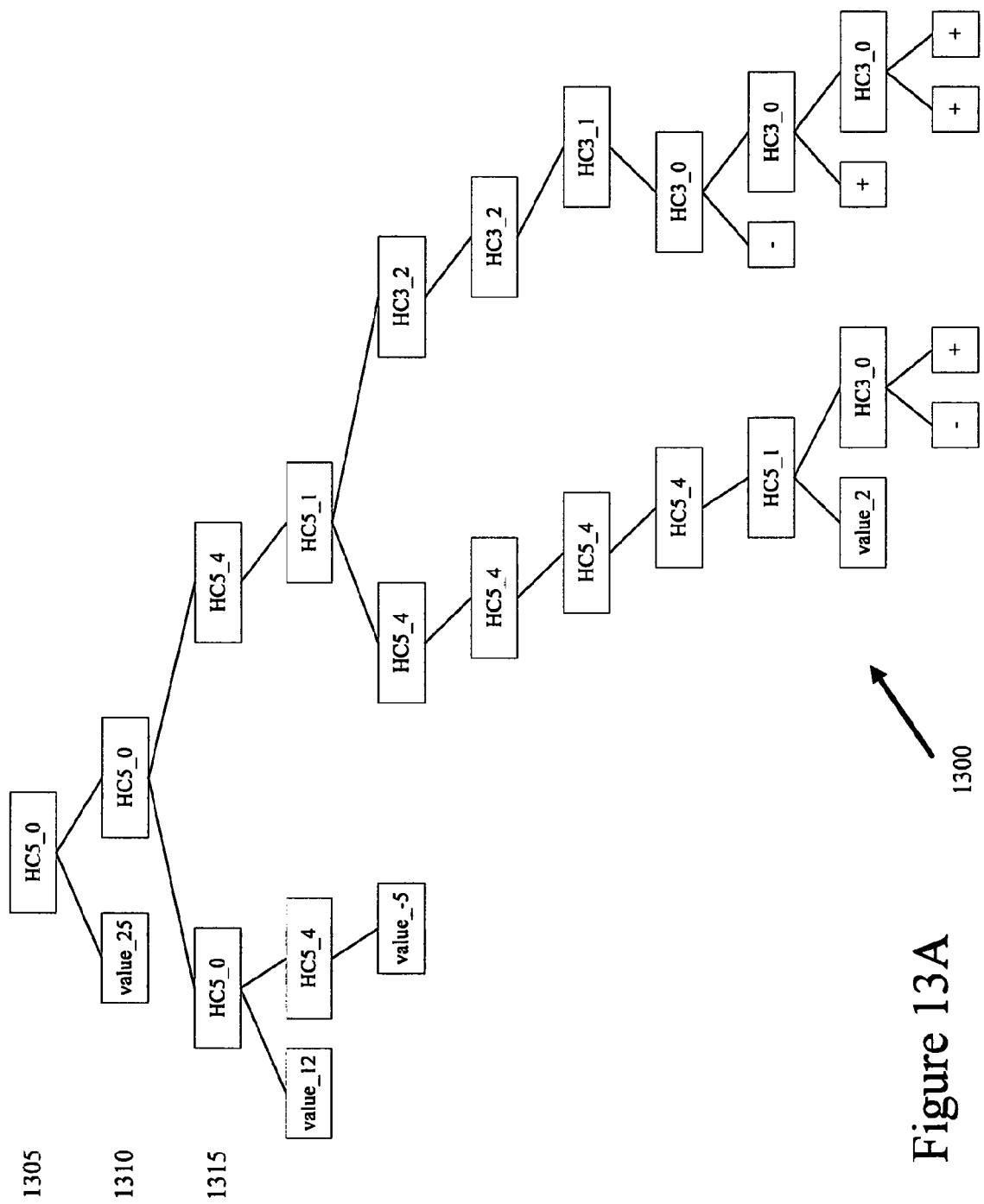
FIGS. 13A and 13B are diagrams illustrating example Huffman codes for the multi-level nested set representations of FIGS. 12A and 12B, respectively.

In the following examples, each of the terms HC5_x and HC3_x is simply an indicator of a Huffman code having a particular pattern of bits. FIG. 13A shows the application of the Huffman codes of Tables 1 and 2 to the multi-level nested set representation of FIG. 12A. At the first level (1305), HC5__0 indicates that the set is split into two subsets, each having at least one non-zero coefficient value with an absolute value greater than 1. The first subset (for position 0) has a single value value__25 that is signaled as one or more variable length codes, for example, Golomb codes or Huffman codes. The second subset (for positions 1 to 63) is also split into two subsets, each having at least one non-zero coefficient value with an absolute value greater than 1, indicated with the code HC5__0. Subsets with non-zero values are split into subsets, as indicated with the Huffman codes. If a subset with non-zero value(s) includes only values of −1, 0 or 1, a Huffman code from Table 1 represents the subset. For example, if a set that includes −1, 1, 1, 1 and eight zeros is split into a first subset with −1, 1, 1 and 1 and a second subset with the eight zeros, the code HC3__1 represents the set. For each 1 or −1, a sign is signaled for the coefficient value, the absolute value being indicated by previous codes.

Figure 13B:
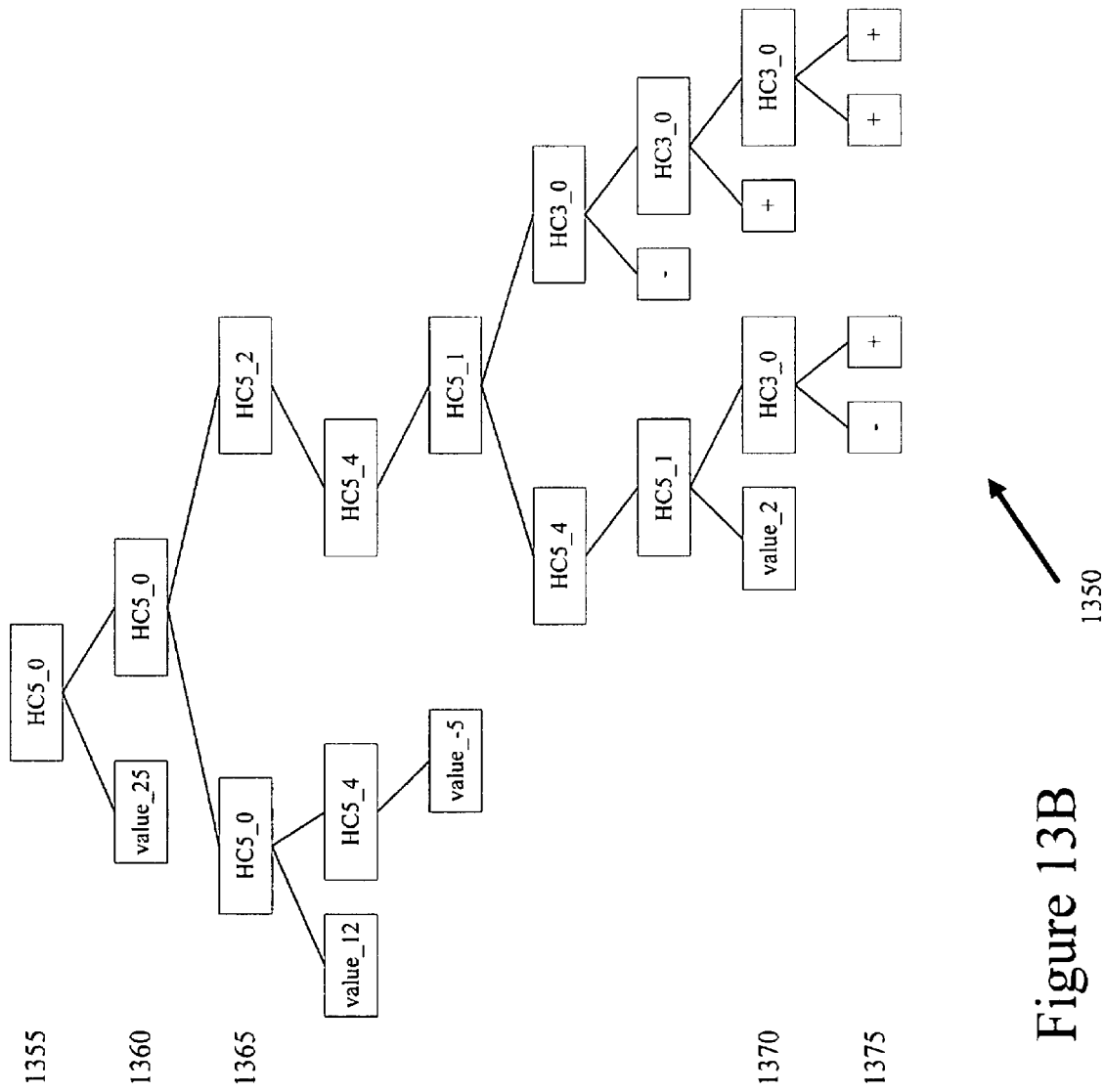

FIG. 13B shows the application of the Huffman codes of Tables 1 and 2 to the multi-level nested set representation of FIG. 12B. Compared to FIG. 13A, fewer Huffman codes are used because the multi-level nested set representation is more compact.

An encoding tool signals the Huffman codes shown in FIGS. 13A and 13B according to a depth-first traversal of the representation. HC5__0, code(s) for 25, HC5__0, HC5__0, code(s) for 12, HC5__4, code(s) for −5, and so on. Alternatively, the encoding tool signals the Huffman codes shown in FIGS. 13A and 13B according to a breadth-first traversal of the representation.

In many encoding scenarios, the Huffman codes facilitate effective encoding and decoding of transform coefficients by grouping zero-value coefficients. When a decoding tool receives a code HC5__4 for a set X, then the decoding tool recognizes that every frequency coefficient in subset X__1 of set X has the value 0. The decoding tool therefore will not need to spend time further decoding subset X__1, but can instead assign the value 0 to every frequency coefficient in the subset X__1 and proceed with decoding a different subset, such as X__2 (which has a non-zero frequency coefficient value indicated for the subset). Thus, this alphabet can decrease the number of symbols necessary to encode a block of frequency coefficients.

Figure 14:
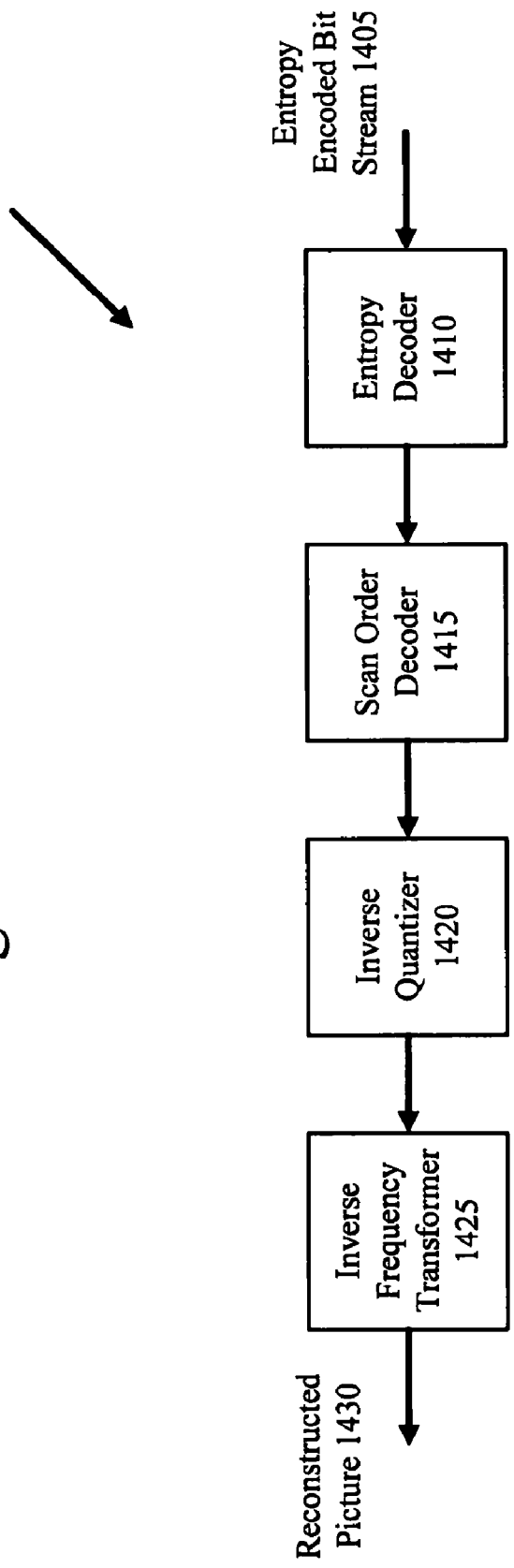
FIG. 14 is a block diagram of a generalized decoding system for decoding a reordered multi-level nested set representation of blocks of a picture.

IX. A Generalized Decoding Tool for a Nested Set Representation of Reordered Frequency Coefficients FIG. 14 shows a block diagram of a generalized decoding tool (1400) adapted to decode an entropy encoded multi-level nested set representation of reordered frequency coefficients. The decoding tool (1400) could be used, for example, to decode the output of the encoding tool (400) shown in FIG. 4.

For the sake of simplicity, FIG. 14 does not show modules of the decoding tool (1400) that relate to motion compensation and other motion processing. In some implementations, in addition to processing blocks of sample values for intra-picture decompression, the tool (1400) processes blocks of sample values of motion-compensation residuals using the modules shown in FIG. 14. For a given residual block, the tool performs entropy encoding of the frequency coefficient values of the residual block, scan reordering, inverse quantization and an inverse frequency transform.

The tool (1400) receives an entropy encoded bit stream (1405) and an entropy decoder (1410) decodes the bit stream (1405) to produce one or more symbols. The bit stream (1405) could be encoded according to adaptive Huffman encoding, run-level encoding, run-length encoding, or some other entropy encoding method of a multi-level nested set representation. The symbols decoded by the entropy decoder (1410) indicate the relative positions and values of one or more plural frequency coefficients in subsets of coefficients in the respective levels of the multi-level nested set representation. The tool (1400) arranges the plural frequency coefficients into a one-dimensional string according to the coefficient positions indicated.

A scan order decoder (1415) arranges the coefficients in a block according to a scan order. The tool (1400) uses a selected one of multiple scan orders available to the scan order decoder (1415). For example, the tool (1400) switches between the scan order (200) in FIG. 2, the scan order (700) in FIG. 7, the scan order (800) in FIG. 8, and one or more other scan orders. The tool (1400) selects between the available scan orders on a block-by-block basis, macroblock-by-macroblock basis, slice-by-slice basis, picture-by-picture basis, or on some other basis. The multiple available scan orders can include one or more pre-defined scan orders that are set at both an encoding tool and the decoding tool (1400). When one of the pre-defined scan orders is used, the decoding tool (400) determines the scan order selection using a code or other bitstream element that identifies the selected scan order. The multiple available scan orders can also include one or more scan orders that are specially defined by the encoding tool during encoding and signaled to the decoding tool (1400) for use in decoding. After signaling the scan order itself, when the encoding tool later uses the scan order, it can signal a code or other bitstream element identifying the scan order, which the decoding tool (1400) has stored. The block of frequency coefficients produced according to the scan order is, in some case, an 8×8 block of frequency coefficients. In other cases, the block is 4×4, 4×8, 8×4, or some other size.

An inverse quantizer (1420) reverses quantizes the transform coefficients. The inverse quantizer (1420) may reverse adaptive spectral quantization or direct quantization. An inverse frequency transformer (1425) performs an inverse frequency transform on the plural frequency coefficients to produce a block of sample values for a picture. The inverse frequency transformer (1425) may apply an 8×8, 8×4, 4×8, 4×4 or other size inverse frequency transform.

The tool (1400) then outputs the reconstructed block as part of a reconstructed picture (1430).

Figure 15:
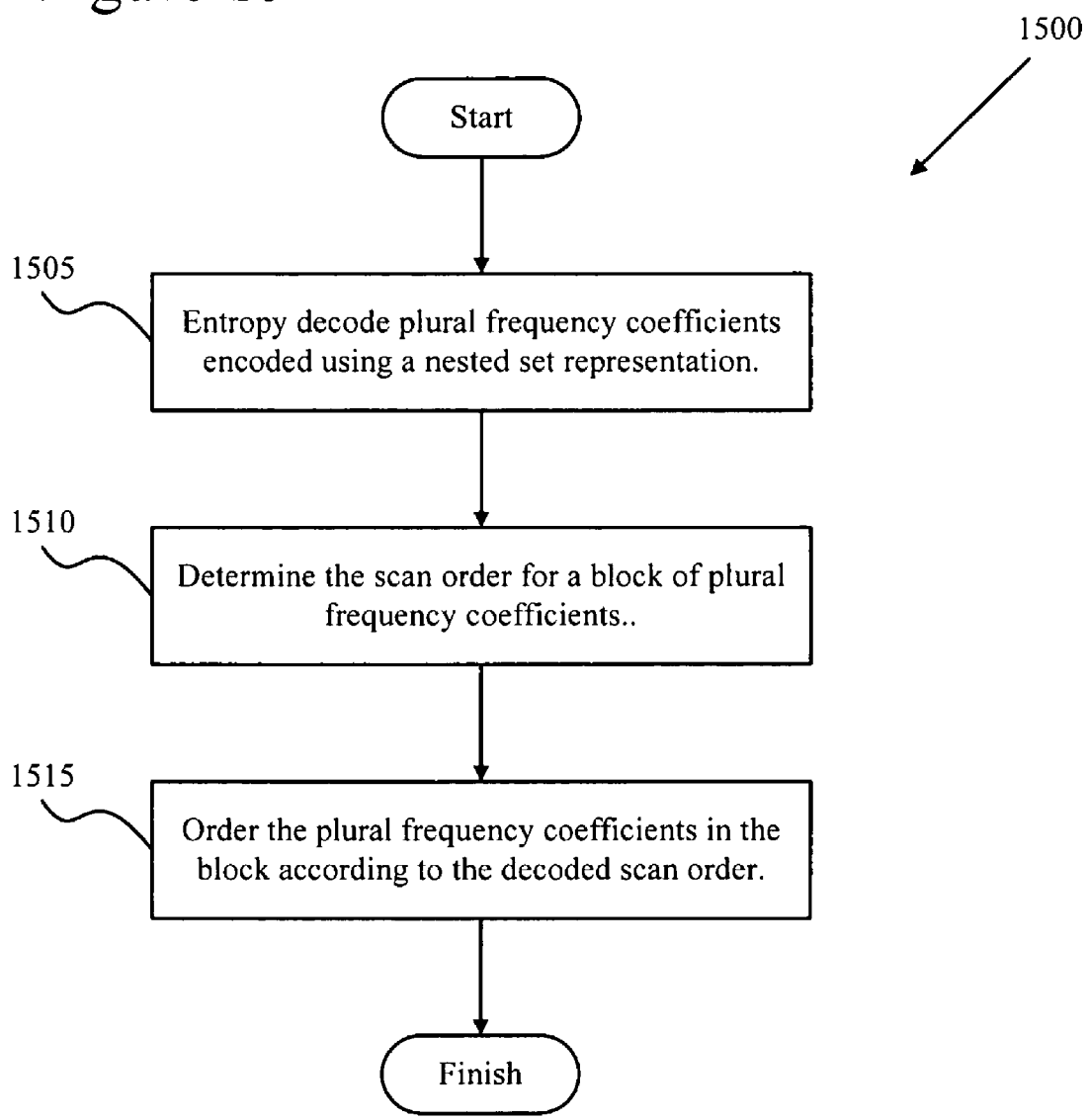
FIG. 15 is a flowchart illustrating a generalized technique for decoding a reordered multi-level nested set representation of a block.

X. Generalized Video Reconstruction Techniques for a Nested Set Representation of Reordered Frequency Coefficients FIG. 15 shows a flowchart of a generalized technique (1500) of reconstructing a block of transform coefficients that were entropy encoded using a multi-level nested set representation. This technique (1500) could be used, for example, by the decoding tool (1400) shown in FIG. 14, to decode transform coefficients encoded according to the technique (500) shown in FIG. 5A. The technique (1500) shown in FIG. 15 includes entropy decoding using a default multi-level nested set representation and adaptive selection of scan order for reordering.

The tool first entropy decodes (1505) plural frequency coefficients that were encoded using a default multi-level nested set representation. The coefficients may have been encoded according to an entropy encoding approach such as adaptive Huffman encoding, run-level encoding or run-length encoding, or according to some other encoding approach. Generally, the tool decodes symbols indicating both the values and the relative positions of the plural frequency coefficients in a one-dimensional string of values. Each of the one or more of the symbols describes the values and relative positions of one or more plural frequency coefficients in a subset.

Next, the tool determines (1510) the scan order for a block of plural frequency coefficients. The tool determine the scan order, for example, by decoding a signal indicating which of a plurality of pre-determined scan orders is to be used.

Finally, the tool orders (1515) the plural frequency coefficient values in the block according to the decoded scan order. Generally, the plural frequency coefficient values are decoded (1505) into a one-dimensional string. The tool orders (1515) the plural frequency coefficient values in the block by traversing the one-dimensional string according to the decoded scan order and arranging the coefficient values into a two-dimensional block of coefficients.

The tool repeats the technique (1500) on a block-by-block basis or some other basis. For example, the tool selects a scan order on a frame-by-frame basis, selecting a scan order for an entire frame and then entropy decoding coefficients and reordering coefficients of blocks in the frame on a block-by-block basis.

Alternatively, a decoding tool performs scan order reordering using a default scan pattern but adaptively selects between different multi-level nested set representations. Such a decoding technique could be used, for example, to decode transform coefficients encoded according to the technique (520) shown in FIG. 5B. Or, a decoding tool adaptively selects between different scan orders and adaptively selects between different multi-level nested set representations, for example, to decode transform coefficients encoded according to the technique (540) shown in FIG. 5C.

Figure 16:
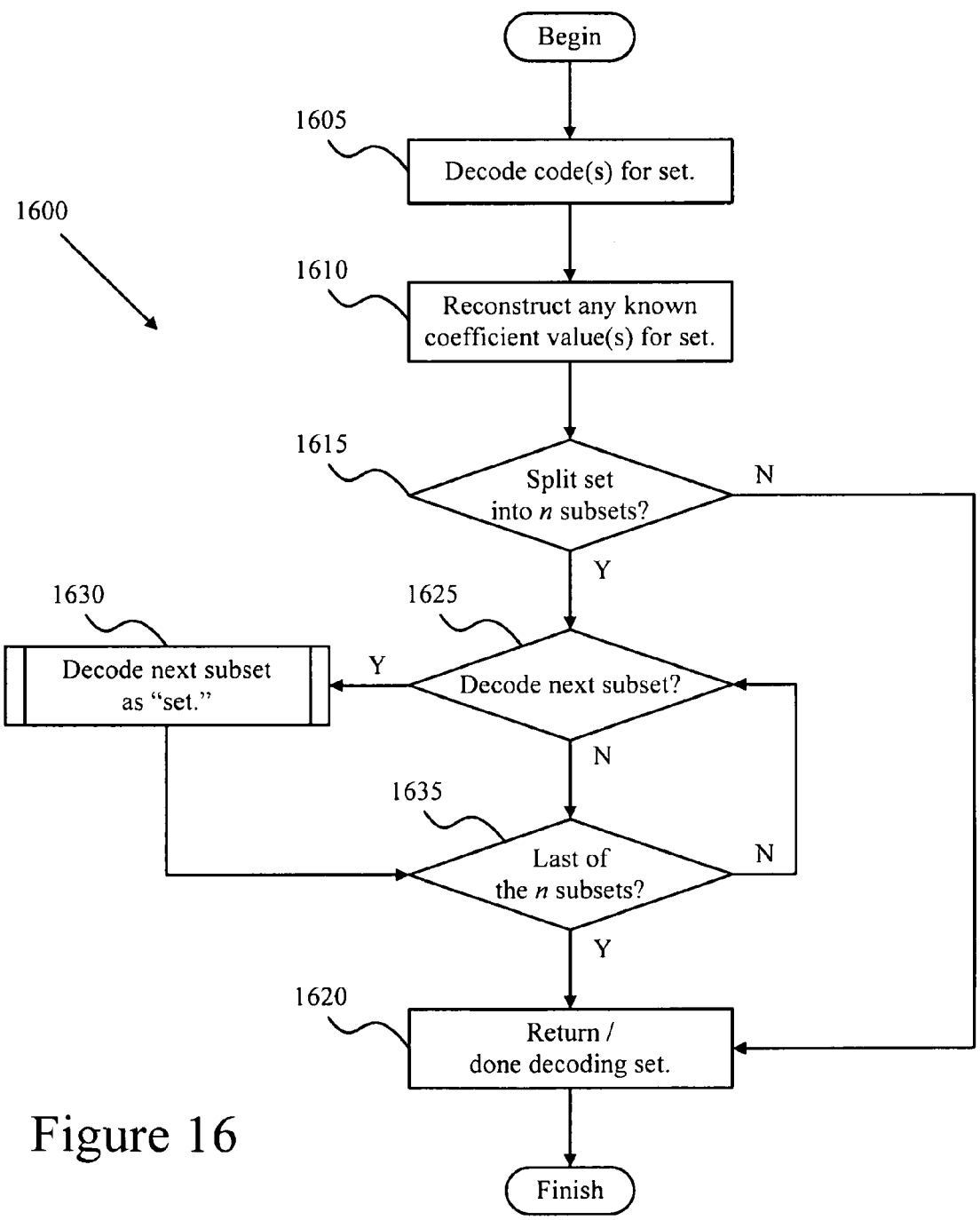
FIG. 16 is a flowchart illustrating an exemplary technique for decoding a reordered multi-level nested set representation of a block.

XI. An Exemplary Method of Reconstructing Video Encoded with a Multi-Level Nested Set Representation FIG. 16 shows a flowchart of an exemplary technique (1600) of reconstructing a block of transform coefficients that was entropy encoded using a multi-level nested set representation. This method could be used, for example, by entropy decoding module (1410) of the decoding tool (1400) shown in FIG. 14, to decode transform coefficients encoded according to the technique (1000) illustrated in FIG. 10. The technique (1400) is recursive. When decoding a set of coefficient values, the technique (1400) in some cases recursively decodes a subset of coefficient values, or each of multiple subsets, within the set. The technique (1400) includes an exit condition, upon which the technique (1400) returns to the point of entry or is done decoding the set.

In this method (1600), the tool receives at least part of an entropy encoded bit stream comprising information about a set of plural frequency coefficients, and the tool decodes (1605) at least part of the entropy encoded bit stream to decode one or more codes for the set. The codes provide information about the presence or absence of non-zero frequency coefficient values for the block of transform coefficients, and, in some implementations, the codes also provide information about the relative positions of one or more of the frequency coefficients in subsets of the block.

The tool uses the decoded one or more codes to reconstruct (1610) any known coefficient values for the given set. For example, the tool uses Golomb-decoding, Huffman decoding, or another form of variable length decoding. If the set being analyzed contains only a single coefficient, then the value of that coefficient will generally be indicated by the one or more decoded codes. The tool can then reconstruct the coefficient value for that particular coefficient. If the amplitude of the value of the single coefficient is implied elsewhere (e.g., when the coefficient is −1 or 1 for some types of entropy coding/decoding), the tool receives and parses a flag indicating the sign of the single coefficient. Or, the code(s) may indicate the values of two or more subsets of coefficients for the given set, where the subsets are at a lower level than the given set in the multi-level nested set representation. For example, the code(s) may indicate that there is a subset of the set at a lower level, and that the subset does not include any non-zero frequency coefficient values. If so, the decoding tool reconstructs the coefficient value 0 for each of the frequency coefficients in that subset.

The tool then analyzes the code(s) to determine (1615) whether to split the set into n lower level subsets. For some multi-level nested set representations, n is equal to 2, though in other representations n may be equal to another integer such as 3 or 4. The tool splits the set into up to n subsets if the tool determines that there is at least one subset of the given set containing a non-zero frequency coefficient. If, for example, there is one subset of the set that contains a non-zero frequency coefficient value, the tool splits the set into the subset that contains the coefficient with the non-zero value (which is further decoded), and a subset that includes only zero-value coefficients (which was previously reconstructed (1610) without further decoding). The code(s) that were previously decoded (1605) indicate which of the subsets contain at least one non-zero frequency coefficient. The tool decodes (1630) the subsets that contain at least one non-zero frequency coefficient.

The tool does not split the set into n lower level subsets if, for example, the set contains only a single frequency coefficient. In this case, the tool already decodes (1605) the code(s) for this single-valued set and reconstructs (1610) the coefficient value for this set. In this example, the tool then returns (1020) to the point of entry (for a subset) or is done decoding that particular set.

If, the tool determines (1615) to split the set into n lower level subsets, the tool checks (1625) the code(s) to determine whether to decode the first of the subsets. If the first subset contains a non-zero frequency coefficient, then the tool decodes (1630) that subset as a "set" by performing the decoding technique (1600) on the subset. When the tool returns from the decoding for that subset, the tool checks (1635) whether there are other subsets remaining to decode. Or, if the first subset is not decoded, the tool checks (1635) whether there are other subsets remaining to decode. If there are other subsets remaining to decode, then the tool checks (1625) whether to decode the next of the n subsets. The tool repeats this process until the check (1635) indicates that there are no other subsets of the given set left to decode, and the tool returns (1020) to the point of entry (for a subset) or is done decoding the given set. Depending on the coefficient values or number of coefficients in the set being decoded, finishing may cause the tool to return to decoding a higher level set or finish decoding the block and begin decoding a next block of video.

XII. Exemplary Decoding of an Encoded Multi-Level Nested Set Representation of Reordered Frequency Coefficients This section continues specific examples of entropy encoding presented above, focusing on details of decoding the code(s) that represent symbols of subsets for a multi-level nested set representation of transform coefficients. Generally, the symbols comprise two or more distinct types of symbols. The first type of symbols indicate the presence or absence of non-zero valued frequency coefficients at one or more positions, and can also indicate certain coefficient values (e.g., zero) or absolute values of coefficients (e.g., 1). The second type of symbols indicate the values of the frequency coefficients at those one or more positions. In other examples, the types of symbols could be combined, further split into different types, or could indicate additional information about the frequency coefficients.

A. Run-length Decoding and Run-Level Decoding

With run-length and run-level coding and decoding, symbols (representing individual coefficient values or subsets of coefficient values) for a given set are encoded as a sequence. In one example of decoding an encoded multi-level nested set representation of transform coefficients, a decoding tool, such as the tool (1400) described with reference to FIG. 14 receives a bit stream of encoded video data. The bit stream includes encoded values for the transform coefficients (100) of FIG. 1 which, during encoding, were scanned into a 1D series of transform coefficients (850) as shown in FIG. 8 and run-level or run-length encoded according to the multi-level nested set representation (1180) shown in FIG. 11C. Run-level or run-length encoding and decoding, of course, may be used with other multi-level nested set representations such as those shown in FIG. 11A or 11B and other scan orders.

When performing run-level decoding, the tool first decodes codes indicating the presence or absence of non-zero valued frequency coefficients for the coefficient position subsets 0-15, 16-31, 32-47, and 48-63 (see FIGS. 1, 8 and 11C), of which only subset 0-15 includes any non-zero coefficient values. The bit stream yields the codes run_level_code_0 and run_level_code_EOB, which indicate run-level encoding results of 0 EOB, which correspond to symbols 1 0 0 0 for the coefficient subsets. The decoding tool reconstructs zero-value coefficients for positions 16 to 63 and receives one or more codes for the subset 0-15, which includes at least one non-zero value.

For the subset 0-15, the tool receives and parses the codes run_level_code_0, run_level_code_1, and run_level_code_0, representing run-level encoding results 0 1 0 for the symbols 1 0 1 1. The decoding tool reconstructs zero-value coefficients for positions 4 to 7 and receives one or more codes for the subset 0-3. The run-level codes for subset 0-3 are decoded to produce the symbols 1 1 0 1 for positions 0 to 3, and the tool receives and parses codes for the non-zero coefficient values at positions 0, 1 and 3. The decoding tool similarly receives and parses codes for subset 8-11, then for subset 12-15, decoding values for positions 8 to 15. Because the tool has placed a coefficient value at each of coefficient positions 0-63, the tool then is done decoding the transform coefficient values for the current block.

Or, when performing run-length decoding, the tool receives and parses codes indicating the presence or absence of non-zero valued frequency coefficients for the coefficient position subsets 0-15, 16-31, 32-47, and 48-63 (see FIGS. 1, 8 and 11C). The bit stream yields the codes run_length_code_0, run_length_code_1, and run_length_code_EOB, which indicate run-length encoding results of 0 1 EOB and correspond to symbols 1 0 0 0 for the coefficient subsets. The symbols 1 0 0 0 indicates that at least one non-zero value is present in positions 0-15, and additionally each of positions 16-63 has a 0-valued frequency coefficient. The decoding tool is thus able to place a value of 0 for each of the frequency coefficients in positions 16-63.

The tool next receives and parses codes indicating the presence or absence of non-zero valued frequency coefficients for the coefficients at positions 0-3, 4-7, 8-11, and 12-15. The bit stream yields the codes run_length_code_0, run_length_code_1, run_length_code_1, and run_length_code_EOB, which correspond to run-length encoding results of 0 1 1 EOB and to symbols 1 0 1 1 for coefficient position subsets 0-3, 4-7, 8-11, and 12-15, respectively. The symbols 1 0 1 1 indicate that at least one non-zero value is present in each of positions 0-3, positions 8-11, and positions 12-15, and that there are no non-zero valued frequency coefficients in positions 4-7, and so the decoding tool places a value of 0 for each of the frequency coefficients in positions 4-7.

Next, the tool receives and parses codes indicating the presence or absence of non-zero valued frequency coefficients for the coefficients at positions 0, 1, 2, and 3. The bit stream yields codes run_length_code_0, run_length_code_2, run_length-code_1, and run_length_code_EOB, which indicate run-length encoding results of 0 2 1 EOB and corresponding symbols 1 1 0 1. Symbols 1 1 0 1 indicate that the coefficients at positions 0, 1, and 3 each contain a frequency coefficient with a non-zero value, while the coefficient at position 2 does not. The tool thus automatically places a value of 0 in the coefficient position 2. The tool further receives and parses the codes value_25, value_12, and value_−5, corresponding to coefficient values of 25, 12, and −5, respectively. Because the tool decoded the symbols 1 1 0 1 for positions 0-3, the tool places the value 25 at position 0, the value 12 at position 1, and the value −5 at position 3. The tool similarly receives and parses codes for subset 8-11 (and its non-zero values) and subset 12-15 (and its non-zero values). Because the tool has placed a coefficient value at each of coefficient positions 0-63, the tool then is done decoding the transform coefficient values for the current block.

In the above-described examples of run-level decoding and run-length decoding, the tool decodes according to a depth-first traversal. The tool decodes symbols for positions 0-63, symbols for positions 0-15, symbols for positions 0-3, a value for position 0, a value for position 1, a value for position 3, symbols for positions 8-11 (since positions 4-7 are known to be zero-valued and hence skipped), and so on. In other examples the tool may instead decode according to a breadth-first traversal, wherein the tool decodes symbols for positions 0-63, symbols for positions 0-15, symbols for positions 0-3, symbols for positions 8-11, symbols for positions 12-15, and then values for positions 0, 1, 3, and 9-15. Alternatively, the tool could use a combination of depth-first and breadth-first traversals.

B. Huffman Decoding

In Huffman coding/decoding implementations, a decoding tool, such as the tool (1400) described with reference to FIG. 14 receives a bit stream that includes Huffman codes, such as those shown in tables 1 and 2, and value codes for transform coefficients of a block. The tool then decodes the bit stream to reconstruct the values and relative positions of the frequency coefficients. In this example, the tool receives a bit stream containing codes such as those shown in FIG. 13B that were used to encode the one-dimensional string (850) of FIG. 8 with the exemplary multi-level nested set representation shown in FIG. 11A. Huffman encoding and decoding, however, may be used for a variety of different multi-level nested set representations such as those shown in FIG. 11B or 11C, for different code structures than those shown in Tables 1 and 2, and for other scan orders.

The tool first decodes codes signaled in the bit stream at the frame level, sequence level, or some other level to produce some indication of the structure of the multi-level nested set representation. For example, the tool determines the structure of the multi-level nested set representation used to encode the one-dimensional string.

The tool receives and parses the code HC5_0, which indicates that both the first first-level subset (corresponding to the coefficient at position 0) and the second second-level subset (corresponding to the coefficients at positions 1-63) comprise one or more non-zero coefficient values whose absolute value is greater than 1.

The tool next receives and parses the code value_25. In this example, value_25 is an arbitrary indication of a code that corresponds to a value of 25 for the frequency coefficient. The previously decoded code HC5_0 indicates that the value 25 is the value of the coefficient at position 0. Thus, the tool places the value 25 at coefficient position 0 and proceeds to further decode codes in the bit stream.

The tool next receives and parses code HC5_0 from the bit stream, indicating the symbols A2 A2 for subsets 1-3 and 4-63, respectively. The first subset at a next lower level (corresponding to coefficient positions 1-3) and the second set at the next lower level (corresponding to coefficient positions 4-63) both contain one or more non-zero valued frequency coefficients whose absolute value is greater than 1. Following a depth-first traversal of FIG. 13B, the tool receives and parses the codes HC5_0 (for subset 1-3), value_12 (for position 1), HC5_4 (for subset 2-3), value_−5 (for position 3), HC5_2 (for subset 4-63), HC5_4 (for subset 4-15), HC5_1 (for subset 8-15), HC5_4 (for subset 8-11), HC5_1 (for subset 9-11), and so on.

When the tool reaches a code such as the code HC3_0 shown at the second level from the bottom (1370), the code indicates the presence of at least one non-zero coefficient value with an absolute value of 1 in a set, with no coefficient in the set having a greater absolute value. Thus, in addition to decoding the symbols for the coefficients or subsets, the tool only needs to decode a sign value (e.g., sign bit) to indicate whether the non-zero value of the particular frequency coefficient is 1 or −1, as shown in the bottom-most level (1375).

This example describes the decoding process as a depth-first traversal, such that a lower level subset of a first set is decoded before a second set at the same level as the first set. Alternatively, however, the traversal may be breadth-first so that each set at a given level is decoded before a subset at a lower level. Other embodiments may also have different traversal orders.

XIII. Alternatives

Many of the examples presented herein relate to entropy encoding of an 8×8 block of transform coefficients reordered into a one-dimensional vector of 64 transform coefficients. The techniques and tools can also be applied to 4×8 or 8×4 blocks of transform coefficients reordered into one-dimensional vectors of 32 coefficients, 4×4 blocks of transform coefficients reordered into one-dimensional vectors of 16 coefficients, or other sizes of blocks of transform coefficients.

Similarly, many of the examples of nested set representations presented herein relate to one-dimensional vectors of 64 transform coefficients. The techniques and tools presented herein can also be applied to vectors of length 32, length 16, or some other length. The depth and breadth of the nested set representations depend on implementation, with more aggressive splitting of sets into subsets tending to yield broader, shallower representations, and vice versa.

While example scan orders are described above, the techniques and tools presented herein can be performed with other scan orders. The entropy encoding of reordered transform coefficients can use adaptive Huffman coding, non-adaptive Huffman coding, run-level coding, another variation of run length coding, or some other type of entropy encoding.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing device comprising a processing unit, memory and storage media storing computer-executable instructions which, when executed, cause the computing device to perform a method of encoding video, the method comprising:

selecting one of a plurality of scan orders;

outputting information indicating the selected scan order in a bit stream;

applying the selected scan order to reorder plural frequency coefficients of a block;

entropy coding the reordered plural frequency coefficients using a multi-level nested-set representation of the reordered plural frequency coefficients, including:

representing a first set of one or more of the reordered plural frequency coefficients as a summary representation with a first symbol at a first level of the multi-level nested-set representation;

entropy coding the first symbol and a second symbol at the first level of the multi-level nested-set representation; and at a given level of the multi-level nested set representation that is lower than the first level:

encoding plural symbols at the given level, each of the plural symbols at the given level representing a set of one or more of the reordered plural frequency coefficients; and for each of the plural symbols at the given level, determining whether to split the set for the symbol into plural subsets and, if so, encoding plural sub-symbols at a lower level of the multi-level nested-set representation, each of the plural sub-symbols at the lower level representing one of the plural subsets; and outputting the entropy coded frequency coefficients in the bit stream.

2. The computing device of claim 1 wherein the first symbol indicates the presence or absence of non-zero coefficient values among the first set of reordered frequency coefficients.

3. The computing device of claim 1 wherein the second symbol represents one of the reordered plural frequency coefficients outside of the first set.

4. The computing device of claim 3 wherein the entropy coding the first symbol and the second symbol includes jointly coding the first symbol and the second symbol using Huffman coding.

5. The computing device of claim 1 wherein the entropy coding the first symbol and the second symbol includes run length coding the first symbol and the second symbol along with one or more other symbols.

6. The computing device of claim 1 wherein the entropy coding the reordered plural frequency coefficients further comprises:

representing a second set of one or more of the reordered plural frequency coefficients as a summary representation with the second symbol at the first level of the multi-level nested-set representation, wherein the entropy coding the first symbol and the second symbol includes jointly coding the first symbol and the second symbol using Huffman coding.

7. The computing device of claim 1 wherein the first set includes at least one non-zero coefficient value, and wherein the entropy coding the reordered plural frequency coefficients further comprises, at the given level of the multi-level nested-set representation lower than the first level, entropy coding coefficient values for the respective coefficients of the first set as the plural symbols at the given level, none of the plural symbols at the given level being further split.

8. The computing device of claim 1 wherein the first set includes at least one non-zero coefficient value, and wherein the entropy coding the reordered plural frequency coefficients further comprises:

representing a first subset of one or more of the frequency coefficients of the first set as a summary representation with a first sub-symbol among the plural symbols at the given level of the multi-level nested-set representation lower than the first level.

9. The computing device of claim 8 wherein the encoding the plural sub-symbols at the lower level includes entropy coding, at the lower level, coefficient values for the respective coefficients of the first subset.

10. The computing device of claim 1 wherein the selecting comprises:

evaluating plural pre-determined scan orders among the plurality of scan orders; and if none of the plural pre-determined scan orders produces suitably reordered frequency coefficients for entropy encoding, creating a new scan order of the plurality of scan orders.

11. The computing device of claim 1 wherein the selecting is based upon measurement of entropy coded coefficient values resulting from a closed-loop application of each of the plurality of scan orders.

12. The computing device of claim 1 wherein the selecting is based upon the results of an open-loop evaluation of clustering of non-zero coefficient values upon application of one or more of the plurality of scan orders.

13. The computing device of claim 1 wherein the plurality of scan orders are pre-determined.

14. The computing device of claim 1 wherein the applying the selected scan order to reorder the plural frequency coefficients includes traversing a two-dimensional block of the plural frequency coefficients according to the selected scan order and reordering the plural frequency coefficients into a one-dimensional string.

15. The computing device of claim 1 wherein the computing device further comprises an input device, an output device and a wireless communication connection.

16. In a computing device that implements a video encoder, a method of encoding video, the method comprising:

selecting one of a plurality of scan orders;

outputting information indicating the selected scan order in a bit stream;

applying the selected scan order to reorder plural frequency coefficients of a block;

with the computing device that implements the video encoder, entropy coding the reordered plural frequency coefficients using a multi-level nested-set representation of the reordered plural frequency coefficients, including:

representing a first set of one or more of the reordered plural frequency coefficients as a summary representation with a first symbol at a first level of the multi-level nested-set representation;

entropy coding the first symbol and a second symbol at the first level of the multi-level nested-set representation; and at a given level of the multi-level nested set representation that is lower than the first level:

encoding plural symbols at the given level, each of the plural symbols at the given level representing a set of one or more of the reordered plural frequency coefficients; and for each of the plural symbols at the given level, determining whether to split the set for the symbol into plural subsets and, if so, encoding plural sub-symbols at a lower level of the multi-level nested-set representation, each of the plural sub-symbols at the lower level representing one of the plural subsets; and outputting the entropy coded frequency coefficients in the bit stream.

17. The method of claim 16 wherein the first symbol indicates the presence or absence of non-zero coefficient values among the first set of reordered frequency coefficients.

18. The method of claim 16 wherein the second symbol represents one of the reordered plural frequency coefficients outside of the first set.

19. The method of claim 18 wherein the entropy coding the first symbol and the second symbol includes jointly coding the first symbol and the second symbol using Huffman coding.

20. The method of claim 16 wherein the entropy coding the first symbol and the second symbol includes run length coding the first symbol and the second symbol along with one or more other symbols.

21. The method of claim 16 wherein the entropy coding the reordered plural frequency coefficients further comprises:
representing a second set of one or more of the reordered plural frequency coefficients as a summary representation with the second symbol at the first level of the multi-level nested-set representation, wherein the entropy coding the first symbol and the second symbol includes jointly coding the first symbol and the second symbol using Huffman coding.

22. The method of claim 16 wherein the first set includes at least one non-zero coefficient value, and wherein the entropy coding the reordered plural frequency coefficients further comprises, at the given level of the multi-level nested-set representation lower than the first level, entropy coding coefficient values for the respective coefficients of the first set as the plural symbols at the given level, none of the plural symbols at the given level being further split.

23. The method of claim 16 wherein the first set includes at least one non-zero coefficient value, and wherein the entropy coding the reordered plural frequency coefficients further comprises:
representing a first subset of one or more of the frequency coefficients of the first set as a summary representation with a first sub-symbol among the plural symbols at the given level of the multi-level nested-set representation lower than the first level.

24. The method of claim 23 wherein the encoding the plural sub-symbols at the lower level includes entropy coding, at the lower level, coefficient values for the respective coefficients of the first subset.

25. The method of claim 23 wherein the selecting comprises:
evaluating plural pre-determined scan orders among the plurality of scan orders; and
if none of the plural pre-determined scan orders produces suitably reordered frequency coefficients for entropy encoding, creating a new scan order of the plurality of scan orders.

26. The method of claim 23 wherein the selecting is based upon measurement of entropy coded coefficient values resulting from a closed-loop application of each of the plurality of scan orders.

27. The method of claim 23 wherein the selecting is based upon the results of an open-loop evaluation of clustering of non-zero coefficient values upon application of one or more of the plurality of scan orders.

28. The method of claim 23 wherein the plurality of scan orders are pre-determined.

29. The method of claim 23 wherein the applying the selected scan order to reorder the plural frequency coefficients includes traversing a two-dimensional block of the plural frequency coefficients according to the selected scan order and reordering the plural frequency coefficients into a one-dimensional string.

* * * * *

UNITED STATES PATENT AND TRADEMARK OFFICE
CERTIFICATE OF CORRECTION

PATENT NO.       : 8,179,974 B2
APPLICATION NO.  : 12/151069
DATED            : May 15, 2012
INVENTOR(S)      : Chengjie Tu et al.

It is certified that error appears in the above-identified patent and that said Letters Patent is hereby corrected as shown below:

In column 30, line 8, in Claim 25, delete "claim 23" and insert -- claim 16 --, therefor.

In column 30, line 15, in Claim 26, delete "claim 23" and insert -- claim 16 --, therefor.

In column 30, line 19, in Claim 27, delete "claim 23" and insert -- claim 16 --, therefor.

In column 30, line 24, in Claim 28, delete "claim 23" and insert -- claim 16 --, therefor.

In column 30, line 26, in Claim 29, delete "claim 23" and insert -- claim 16 --, therefor.

Signed and Sealed this
First Day of January, 2013

David J. Kappos
*Director of the United States Patent and Trademark Office*